United States Patent
da Silva et al.

(10) Patent No.: US 10,798,573 B2
(45) Date of Patent: Oct. 6, 2020

(54) ENHANCEMENTS TO LOAD REPORTING FROM A WIRELESS LOCAL-AREA NETWORK TO AN LTE NETWORK

(71) Applicant: Telefonaktiebolaget L M Ericsson (publ), Stockholm (SE)

(72) Inventors: Icaro L. J. da Silva, Bromma (SE); Angelo Centonza, Winchester (GB); Gino Luca Masini, Stockholm (SE); Mattias Tan Bergström, Stockholm (SE); Oumer Teyeb, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 282 days.

(21) Appl. No.: 14/894,243

(22) PCT Filed: Sep. 25, 2015

(86) PCT No.: PCT/SE2015/051010
§ 371 (c)(1),
(2) Date: Nov. 25, 2015

(87) PCT Pub. No.: WO2016/048229
PCT Pub. Date: Mar. 31, 2016

(65) Prior Publication Data
US 2016/0295466 A1    Oct. 6, 2016

Related U.S. Application Data

(60) Provisional application No. 62/056,074, filed on Sep. 26, 2014.

(51) Int. Cl.
*H04W 36/00* (2009.01)
*H04W 36/22* (2009.01)
(Continued)

(52) U.S. Cl.
CPC .... *H04W 12/0609* (2019.01); *H04W 36/0011* (2013.01); *H04W 36/0022* (2013.01);
(Continued)

(58) Field of Classification Search
CPC ......... H04W 36/0022; H04W 36/0088; H04W 84/12
See application file for complete search history.

(56) References Cited

U.S. PATENT DOCUMENTS 9,860,872 B2 * 1/2018 Himayat ............... H04W 72/02
2007/0183383 A1 8/2007 Bitran et al.
(Continued)

FOREIGN PATENT DOCUMENTS

CN 102651875 A 8/2012
WO 2013155916 A1 10/2013
(Continued)

OTHER PUBLICATIONS

3GPP TR 37.834 V0.4.0 (Aug. 2013) Study on WLAN/3GPP Radio Interworking (Release 12).*
(Continued)

Primary Examiner — Jeffrey M Rutkowski
Assistant Examiner — Basil Ma
(74) Attorney, Agent, or Firm — Murphy, Bilak & Homiller, PLLC

(57) ABSTRACT

A node of a wireless local-area network, WLAN, determines (1820) a per-cell load value for each of two or more cells in a wide-area cellular network, the per-cell load value indicating, for a first WLAN access point, a portion of the WLAN access point's load corresponding to wireless terminals connected to the first WLAN AP and associated with the respective cell. The WLAN node sends (1830) a report
(Continued)

to a node in the wide-area cellular network, the report indicating the per-cell load value for at least one of the two or more cells.

38 Claims, 15 Drawing Sheets

(51) Int. Cl.
*H04W 12/06* (2009.01)
*H04W 84/12* (2009.01)
*H04W 48/18* (2009.01)
*H04W 88/06* (2009.01)
*H04W 36/14* (2009.01)
*H04W 28/08* (2009.01)

(52) U.S. Cl.
CPC ... *H04W 36/0066* (2013.01); *H04W 36/0088* (2013.01); *H04W 36/22* (2013.01); *H04W 28/08* (2013.01); *H04W 36/14* (2013.01); *H04W 48/18* (2013.01); *H04W 84/12* (2013.01); *H04W 88/06* (2013.01)

(56) References Cited

U.S. PATENT DOCUMENTS

| | | | |
|---|---|---|---|
| 2014/0064068 A1 | 3/2014 | Horn et al. | |
| 2014/0079022 A1 | 3/2014 | Wang et al. | |
| 2015/0029879 A1* | 1/2015 | Chou | H04W 74/0833 370/252 |
| 2015/0092553 A1 | 4/2015 | Sirotkin et al. | |
| 2015/0092688 A1 | 4/2015 | Jeong et al. | |
| 2015/0103648 A1 | 4/2015 | Chou | |
| 2015/0271729 A1* | 9/2015 | Sirotkin | H04W 48/00 370/332 |
| 2015/0341821 A1 | 11/2015 | Hong et al. | |
| 2016/0007268 A1* | 1/2016 | Jung | H04W 48/08 370/338 |
| 2016/0037533 A1* | 2/2016 | Lee | H04W 36/22 370/236 |
| 2016/0112921 A1 | 4/2016 | Nagasaka et al. | |
| 2016/0255571 A1 | 9/2016 | Yan et al. | |
| 2016/0323889 A1* | 11/2016 | Jeon | H04W 72/0486 |
| 2017/0048914 A1 | 2/2017 | Zeng et al. | |
| 2017/0070923 A1 | 3/2017 | Li et al. | |
| 2017/0150398 A1 | 5/2017 | Laselva et al. | |

FOREIGN PATENT DOCUMENTS

| | | |
|---|---|---|
| WO | 2014043500 A1 | 3/2014 |
| WO | 2014067565 A1 | 5/2014 |
| WO | 2014084792 A1 | 6/2014 |
| WO | 2014110777 A1 | 7/2014 |
| WO | 2014111808 A2 | 7/2014 |
| WO | 2014119968 A1 | 8/2014 |
| WO | 2014148860 A1 | 9/2014 |
| WO | 2014165832 A1 | 10/2014 |
| WO | 2014182611 A1 | 11/2014 |
| WO | 2015020586 A1 | 2/2015 |
| WO | 2015023449 A2 | 2/2015 |
| WO | 2015024598 A1 | 2/2015 |

OTHER PUBLICATIONS

3GPP, "3rd Generation Partnership Project; Technical Specification Group Core Network and Terminals; Access Network Discovery and Selection Function (ANDSF) Management Object (MO) (Release 12)", 3GPP TS 24.312 V12.6.0, Sep. 2014, 1-354.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.3.0, Sep. 2014, 1-215.

3GPP, "3rd Generation Partnership Project; Technical Specification Group Radio Access Network; Study on Multi-RAT joint coordination (Release 13)", 3GPP TR 37.870 V0.2.0, May 2014, 1-15.

3GPP, "3rd Generation Partnership Project; Technical Specification Group Services and System Aspects; Architecture enhancements for non-3GPP accesses (Release 11)", 3GPP TS 23.402 V11.4.0, Sep. 2012, 1-252.

3GPP, "3rd Generation Partnership Project; Technical Specification Group Services and System Aspects; Architecture enhancements for non-3GPP accesses (Release 12)", 3GPP TS 23.402 V12.6.0, Sep. 2014, 1-288.

Unknown, Author, "3GPP-WLAN Coordination Scenarios", Ericsson, 3GPP TSG-RAN WG3 #85, R3-141884, Dresden, Germany, Aug. 18-22, 2014, 1-4.

Unknown, Author, "Parameters Exchanged from the WLAN to the eNB", Ericsson, 3GPP TSG-RAN WG3 #85, R3-142023, Dresden, Germany, Aug. 18-22, 2014, 1-2.

Unknown, Author, "3rd Generation Partnership Project; Technical Specification Group Radio Access Network; Evolved Universal Terrestrial Radio Access Network (E-UTRAN); X2 application protocol (X2AP) (Release 12)", 3GPP TS 36.423 V12.3.0, Sep. 2014, 1-153.

Unknown, Author, "WLAN-eNB Load Reporting", Ericsson, 3GPP TSG-RAN WG3 #85bis, R3-142442, Shanghai, China, Oct. 6-10, 2014, 1-3.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.3.0, Sep. 2012, 1-205.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.2.0, Jun. 2014, 1-215.

3GPP, "3rd Generation Partnership Project; Technical Specification Group Radio Access Network; Evolved Universal Terrestrial Radio Access (E-UTRA); User Equipment (UE) procedures in idle mode (Release 12)", 3GPP TS 36.304 V12.2.0, Sep. 2014, 1-37.

3GPP, "3rd Generation Partnership Project; Technical Specification Group Radio Access Network; Study on Wireless Local Area Network (WLAN)—3GPP radio interworking (Release 12)", 3GPP TR 37.834 V12.0.0, Dec. 2013, 1-17.

Rigney, C. et al., "Remote Authentication Dial in User Service (RADIUS)", Network Working Group, Request for Comments: 2865, Jun. 2000, 1-77.

Unknown, Author, "3GPP-WLAN Coordination Scenario and parameters usage", Catt et al., 3GPP TSG RAN WG3 Meeting #87, R3-150222, Athens, Greece, Feb. 9-13, 2015, 1.

Unknown, Author, "LTE/UMTS/WLAN load balancing", Intel Corporation, 3GPP TSG-RAN3 Meeting #85bis, R2-142399, Shanghai, China, Oct. 6-10, 2014, 1-2.

Unknown, Author, "PTID based UE identity correlation between 3GPP RAN and WT", Nokia Networks, 3GPP TSG-RAN WG3 Meeting #87bis, R3-150773, Santa Cruz, Spain, Apr. 20-24, 2015, 1-3.

Unknown, Author, "Use Case for enhancement of 3GPP-WLAN traffic steering", Nokia Networks, CMCC, 3GPP TSG-RAN WG3 Meeting #87, R3-150183, Athens, Greece, Feb. 9-13, 2015, 1-3.

Unknown, Author, "WLAN-eNB Traffic Offload Considerations", Ericsson, 3GPP TSG-RAN WG3 #87, R3-150323, Athens, Greece, Feb. 9-13, 2015, 1-3.

* cited by examiner

ENHANCEMENTS TO LOAD REPORTING FROM A WIRELESS LOCAL-AREA NETWORK TO AN LTE NETWORK

TECHNICAL FIELD

The technology disclosed herein relates generally to wireless communication networks, and more particularly relates to techniques for sharing information between wireless local-area networks and cellular networks to improve traffic offloading.

BACKGROUND

The Evolved UMTS Terrestrial Radio Access Network (E-UTRAN), standardized by members of the 3rd Generation Partnership Project (3GPP), includes base stations called enhanced NodeBs (eNBs or eNodeBs), providing the E-UTRA user plane and control plane protocol terminations towards the UE. The eNBs are interconnected with each other using the X2 interface. The eNBs are also connected using the S1 interface to the EPC (Evolved Packet Core), more specifically to the MME (Mobility Management Entity) by means of the S1-MME interface and to the Serving Gateway (S-GW) by means of the S1-U interface. The S1 interface supports many-to-many relation between MMEs/S-GWs and eNBs. A simplified view of the E-UTRAN architecture is provided by FIGS. 1 and 2.

The eNB 110 hosts functionalities such as Radio Resource Management (RRM), radio bearer control, admission control, header compression of user plane data towards serving gateway, and/or routing of user plane data towards the serving gateway. The MME 120 is the control node that processes the signaling between the UE and the CN (core network). Significant functions of the MME 120 are related to connection management and bearer management, which are handled via Non Access Stratum (NAS) protocols. The S-GW 130 is the anchor point for UE mobility, and also includes other functionalities such as temporary DL (down link) data buffering while the UE is being paged, packet routing and forwarding to the right eNB, and/or gathering of information for charging and lawful interception. The PDN Gateway 140 (P-GW, not shown in FIG. 1) is the node responsible for UE IP address allocation, as well as Quality of Service (QoS) enforcement (as further discussed below). The reader is referred to 3GPP TS 36.300 and the references therein for further details of functionalities of the different nodes.

FIG. 2 gives a summary of the functionalities of the different nodes. The reader is referred to the 3GPP document "Evolved Universal Terrestrial Radio Access (E-UTRA) and Evolved Universal Terrestrial Radio Access Network (E-UTRAN); Overall Description; Stage 2," 3GPP TS 36.300, v. 11.3.0 (September 2012), available at www.3gpp.org, and the references therein for the details of the functionalities of the different nodes. In FIG. 2, the boxes labeled eNB 110, MME 120, S-GW 130, and P-GW 140 depict the logical nodes, which may correspond to separate and distinct physical units, in some cases. The smaller boxes within the larger boxes depict the functional entities of the control plane. The shaded boxes within the box labeled eNB 110 depict the radio protocol layers.

The wireless local-area network (WLAN) technology known as "Wi-Fi" has been standardized by IEEE in the 802.11 series of specifications (i.e., as "IEEE Standard for Information technology-Telecommunications and information exchange between systems. Local and metropolitan area networks-Specific requirements. Part 11: Wireless LAN Medium Access Control (MAC) and Physical Layer (PHY) Specifications").

Using Wi-Fi/WLAN (the two terms are used interchangeably throughout this document) to offload traffic from the mobile networks is becoming more and more interesting from both the operators' and end users' points of view. Reasons for this include the additional frequency that may be obtained—by using Wi-Fi, operators can access an additional 85 MHz of radio bandwidth in the 2.4 GHz band and nearly another 500 MHz in the 5 GHz band. Cost is another factor, as Wi-Fi uses unlicensed frequency that is free of charge. On top of that, the cost of a typical Wi-Fi Access Points (AP), from both capital expense (CAPEX) and operational expense (OPEX) perspectives, is considerably lower than that of a 3GPP base station (BS/eNB).

In addition, operators can take advantage of already deployed APs that are already deployed in hotspots such as train stations, airports, stadiums, shopping malls, etc. Further, most end users are also currently accustomed to having Wi-Fi for "free" at home (as home broadband subscriptions are usually flat rate) and at many public places. Another factor is the high data rates that are increasingly demanded by customers. Under low interference conditions and assuming the user is close to the Wi-Fi AP, Wi-Fi can provide peak data rates that outshine that of current mobile networks (for example, theoretically up to 600 Mbps for IEEE 802.11n deployments with MIMO (Multiple Input Multiple Output)).

Still another factor in this increased interest in Wi-Fi integration, or at least in closer cooperation between WLANs and cellular networks, is the rapidly increasing support for Wi-Fi among cellular telephones. Many portable devices currently available in the market, including virtually all smartphones, support Wi-Fi. Note that in the specifications that define the Wi-Fi world, the term "station" (STA) is used instead of UE; because this document is generally considered with devices that support both a cellular technology (such as E-UTRA) and Wi-Fi, the terms UE, STA and terminal are used interchangeably in this document.

A very simplified Wi-Fi architecture is illustrated in FIG. 3 and FIG. 4, below. On the user plane, illustrated in FIG. 3, a very lean architecture is employed, where the UE/STA is connected to the Wi-Fi Access Point (AP). The Wi-Fi in turn can be directly connected to the Internet, thus providing the UE/STA access to application servers on the Internet. In the control plane, as illustrated in FIG. 4, an Access point Controller (AC) may handle the management of the AP. One AC usually handles the management of several APs. Security/authentication of users can be handled via an Authentication, Authorization and Accounting (AAA) entity, which is shown as a RADIUS server in FIG. 4. Remote Administration Dial-In User Service (RADIUS) is the most widely used network protocol for providing a centralized AAA management (RFC 2865).

The Access Network Discovery and Selection Function (ANDFS) is an entity defined by 3GPP for providing access discovery information as well as mobility and routing policies to the UE. ANDFS is a new entity added to the 3GPP architecture in Release 8 of 3GPP TS 23.402. (See "Architecture Enhancements for non-3GPP Accesses," 3GPP TS 23.402, v. 11.4.0 (September 2012), available at www.3gpp.org.) A simplified ANDSF architecture is depicted in FIG. 5. As shown in the figure, the ANDSF server is connected to the UE, and its main goal is to provide the UE with access network information in a resource efficient and secure manner. The communication between the UE and the ANDSF server is defined as an IP-based interface referred to as the S14 interface.

By supplying information about both available 3GPP and non-3GPP access networks to the UE, the ANDSF enables an energy-efficient mechanism of network discovery, where the UE can avoid continuous and energy-consuming background scanning. Furthermore, ANDSF provides the mobile operators with a tool for the implementation of flexible and efficient UE steering of access mechanisms, where policy control can guide UEs to select one particular RAN over another.

The ANDSF supplies three types of information—discovery information, inter-system mobility policies (ISMP) and inter-system routing policies (ISRP). All these are summarized and implemented via ANDSF managed objects (MO), which are communicated to the UEs via an over-the-top (OTT) signaling channel, as SOAP-XML messages.

The discovery information provides the UE with information regarding the availability of different RATs in the UE's vicinity. This helps the UE to discover available access networks, including 3GPP and non-3GPP access networks, without the burden of continuous background scanning. Inter-System Mobility Policies (ISMP) are policies which guide the UE to select the most preferable 3GPP or non-3GPP access. The ISMP are used for UEs that access a single access network (e.g., 3GPP or Wi-Fi) at a time.

The ISMP information specifies the behavior of UEs that can be connected to only one access network at a given time (either 3GPP, WLAN, WiMAX, etc). If the UE, however, supports connection to several access networks at the same time, the operator can use the third type of information, ISRP, to increase the granularity of the RAN selection. In that case, the UEs will be provided with policies that specify how the traffic flows should be distributed over the different RAN. For example, voice might be only allowed to be carried over a 3GPP RAN connection, while Internet video streaming and best-effort traffic can be routed via WLAN. The ANDSF provides mobile operators with a tool to determine how the UEs connect to different RANs, and hence allows them to add more flexibility in their traffic planning.

As noted above, because of the proliferation of devices that have both Wi-Fi and 3GPP mobile broadband support, offloading traffic to the Wi-Fi network is becoming very interesting, both from the user's and the operator's perspectives. The main difference between traffic steering to and from Wi-Fi, as compared to steering between 3GPP networks or 3GPP-"friendly" networks such as CDMA2000 networks, is that it is generally the terminal that decides when it shall select a Wi-Fi Access Point (AP), while in wide-area networks it is the network that is in charge of the network access decisions.

For technical and historical reasons, the Wi-Fi deployment scenario is in many cases fundamentally different than the cellular deployment. For this reason, special considerations have to be made when integrating Wi-Fi to 3GPP networks. For example, with currently existing technologies the information regarding a wireless terminal's communication in one wireless network, such as a Wi-Fi, is not readily available in another wireless network. This can be especially problematic if one wireless network is controlling the wireless terminal's communication in the other wireless network. International Patent Application Publication WO 2014/084792 A1 describes a method in a mobile terminal in which the terminal transmits information to a first wireless network of the mobile terminal's connection status with respect to a second wireless network. The techniques described herein thus focus on several aspects of integrating Wi-Fi to 3GPP networks, to realize optimal steering of traffic while considering both the end user's as well as the network's performance.

SUMMARY

Embodiments of the inventive techniques described herein include a set of mechanisms between wireless terminals, a node in the wide-area cellular network, such as an eNB, and a node in the WLAN, such as a WLAN AP. According to these mechanisms, the node in the WLAN groups different wireless terminals based on cells they are associated with. This grouping information is used in communicating load information from the WLAN to neighboring wide-area cellular network nodes.

A first aspect of the inventive methods and apparatus detailed herein relates to a method implemented in a node of a WLAN. An example method according to this aspect includes determining a per-cell load value for each of two or more cells in a wide-area cellular network, the per-cell load value indicating, for a first WLAN AP, a portion of the WLAN AP's load corresponding to wireless terminals connected to the first WLAN AP and associated with the respective cell. The method further includes sending a report to a node in the wide-area cellular network, the report indicating the per-cell load value for at least one of the two or more cells.

A second aspect relates to a method in a node in a wide-area cellular network. An example method according to this second aspect comprises receiving a report from a node in a WLAN, the report indicating a per-cell load value for at least one of two or more cells in the wide-area cellular network, the per-cell load value indicating, for a first WLAN AP, a portion of the WLAN AP's load corresponding to wireless terminals connected to the first WLAN AP and associated with the respective cell. This example method further comprises adapting traffic steering decisions, based on the report, for example by adjusting one or more traffic steering thresholds.

A third aspect relates to a method in a wireless terminal. An example method according to this third aspect includes connecting to a node in a WLAN and, in response to a cell change event for the wireless terminal in a wide-area cellular network, sending an indication of the cell change event to the WLAN. This cell change event may comprise one of the following, for example: an IDLE mode cell selection; an IDLE mode cell reselection; a CONNECTED mode cell handover; a reconnection after radio link failure; and a reconnection after detachment.

A fourth aspect of the techniques disclosed herein relates to a device for use in a WLAN. An example device according to this fourth aspect is adapted to determine a per-cell load value for each of two or more cells in a wide-area cellular network, the per-cell load value indicating, for a first WLAN AP, a portion of the first WLAN AP's load corresponding to wireless terminals connected to the first WLAN AP and associated with the respective cell. This example device is further adapted to send a report to a node in the wide-area cellular network, the report indicating the per-cell load value for at least one of the two or more cells.

A fifth aspect relates to an apparatus for use in a node of a wide-area cellular network. An example apparatus according to this fifth aspect is adapted to receive a report from a node in a WLAN, the report indicating a per-cell load value for at least one of two or more cells in the wide-area cellular network, the per-cell load value indicating, for a first WLAN AP, a portion of the WLAN AP's load corresponding to wireless terminals connected to the first WLAN AP and associated with the respective cell. The example apparatus is further adapted to adapt traffic steering decisions, based on the report.

A sixth aspect relates to a wireless terminal adapted for operation in a WLAN and in a cellular network, where an example wireless terminal according to this aspect is adapted to connect to a node in the WLAN and, in response to a cell change event for the wireless terminal in a wide-area cellular network, send an indication of the cell change event to the WLAN.

Other embodiments of the inventive concepts disclosed herein include computer program products comprising a non-transitory, computer-readable medium having computer readable code embodied therein, the computer readable code being configured such that, on execution by a suitable computer or processor, the computer or processor is caused to perform any of the method embodiments described herein and/or summarized above. In the description that follows, example embodiments according to these and other aspects are described in detail.

BRIEF DESCRIPTION OF THE FIGURES

Exemplary embodiments of the techniques introduced in this document are described below with reference to the following figures, in which.

DETAILED DESCRIPTION

Figure 1:
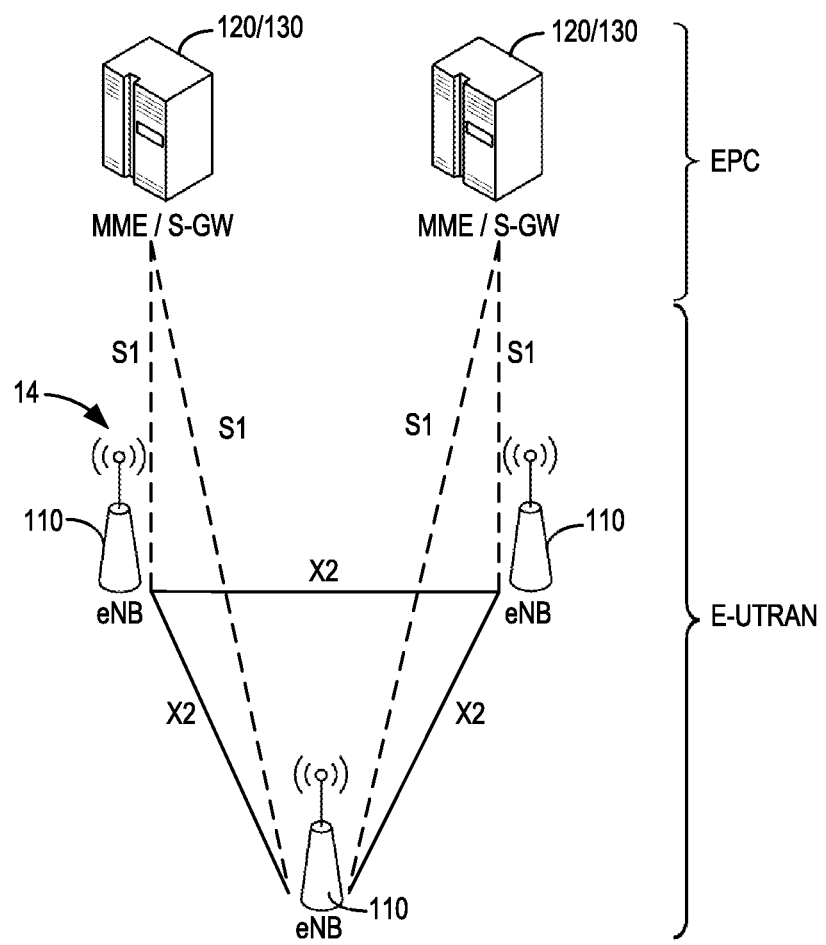
FIG. 1 illustrates the E-UTRA architecture.
Figure 2:
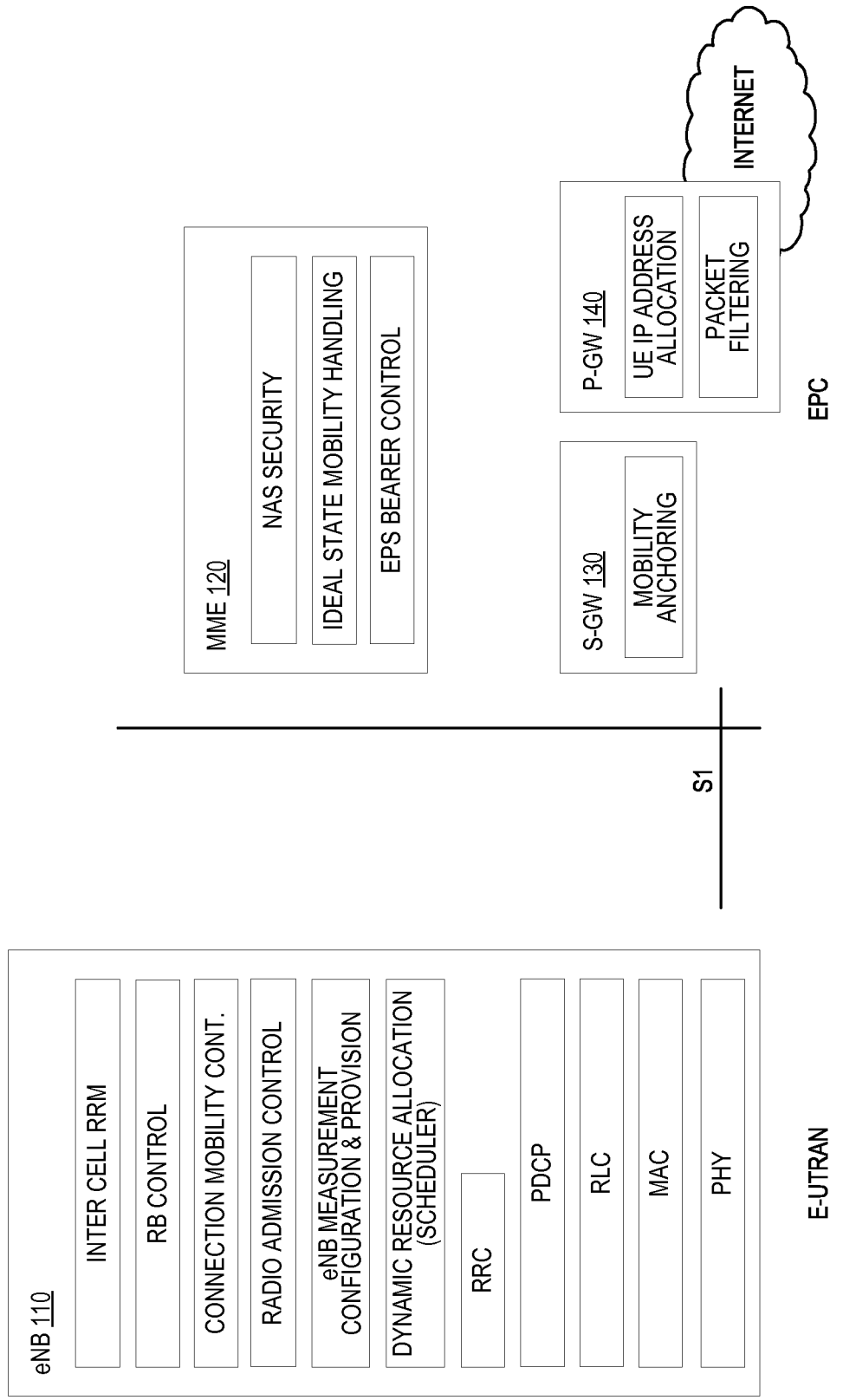
FIG. 2 illustrates the split between the E-UTRAN and the EPC.

Inventive concepts will now be described more fully hereinafter with reference to the accompanying drawings, in which examples of embodiments of inventive concepts are shown. These inventive concepts may, however, be embodied in many different forms and should not be construed as limited to the embodiments set forth herein. Rather, these embodiments are provided so that this disclosure will be thorough and complete, and fully convey the scope of present inventive concepts to those skilled in the art. It should also be noted that these embodiments are not mutually exclusive. Components from one embodiment may be tacitly assumed to be present or used in another embodiment.

As used herein, the terms "mobile terminal," "wireless terminal," "user equipment," or "UE" may be used to refer to any device that receives data from and transmits data to a communication network, any of which may be for example, a mobile telephone ("cellular" telephone), laptop/portable computer, pocket computer, hand-held computer, desktop computer, a machine to machine (M2M) or MTC type device, a sensor with a wireless communication interface, etc. Devices of any of these types may be adapted, according to known techniques and according to the additional techniques disclosed herein, for operation in a device-to-device (D2D) mode, where such operation may include the transmitting and receiving of certain signals that are similar to or identical with corresponding signals used when operating within a cellular network, i.e., in a device-to-base-station operating mode.

A cell in a wide-area cellular network such as the LTE network is associated with a radio access network (RAN) node, where a RAN node comprises in a general sense any node transmitting radio signals in the downlink (DL) to a terminal device and/or receiving radio signals in the uplink (UL) from a terminal device. Some example RAN nodes, or terms used for describing RAN nodes, are base station, eNodeB, eNB, NodeB, macro/micro/pico/femto radio base station, home eNodeB (also known as femto base station), relay, repeater, sensor, transmitting-only radio nodes or receiving-only radio nodes. A RAN node may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band circuitry for different RATs.

It should be noted that unless otherwise indicated, the use of the general term "network node" as used herein refers to a RAN node, such as a base station, an eNodeB, a network node in the RAN responsible for resource management, such as a radio network controller (RNC), a core network node, such as a mobility management entity (MME) or SGW, or a WLAN Access Point (AP) or WLAN access controller (AC).

The signaling described is either via direct links or logical links (e.g. via higher layer protocols and/or via one or more network nodes). For example, signaling from a coordinating node may pass another network node, e.g., a radio node.

Note that although terminology from specifications for the Long-Term Evolution (LTE; also referred to as the Evolved Universal Terrestrial Radio Access Network, or E-UTRAN, is used in this disclosure to exemplify embodiments of the inventive concepts, this should not be seen as limiting the scope of the presently disclosed techniques to only these systems. Devices designed for use in other wireless systems, including variations and successors of 3GPP LTE systems, and WCDMA (UMTS) systems, WiMAX (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of present inventive concepts disclosed herein.

In the discussion that follows, specific details of particular embodiments of the present invention are set forth for purposes of explanation and not limitation. It will be appreciated by those skilled in the art that other embodiments may be employed apart from these specific details. Further, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the present invention may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors and/or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 6:
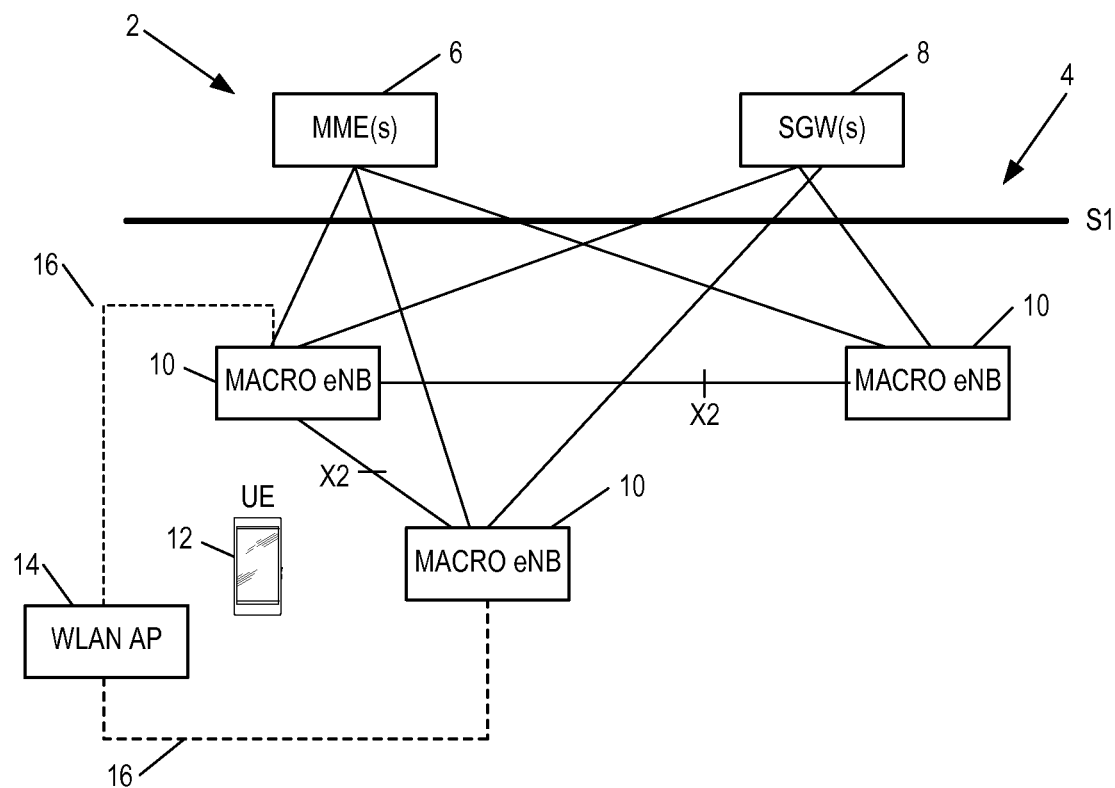
FIG. 6 shows an example of an evolved UMTS Terrestrial Radio Access Network (EUTRAN) architecture as part of an LTE-based communications system.

FIG. 6 shows an example diagram of an evolved UMTS Terrestrial Radio Access Network (EUTRAN) architecture as part of an LTE-based communications system 2. Nodes in the core network 4 include one or more Mobility Management Entities (MMEs) 6, a key control node for the LTE access network, and one or more Serving Gateways (SGWs) 8 which route and forward user data packets while acting as a mobility anchor. They communicate with base stations 10 in the RAN referred to in LTE as eNBs or eNodeBs, over an interface, for example an S1 interface.

The eNBs 10 can include the same or different categories of eNBs, e.g. macro eNBs, and/or micro/pico/femto eNBs. The eNBs 10 communicate with each other over an interface, for example an X2 interface. The S1 interface and X2 interface are defined in the LTE standard. A UE 12 can receive downlink data from and send uplink data to one of the base stations 10 with that base station 10 being referred to as the serving base station of the UE 12. An access point (AP) 14 that is part of a WLAN is also shown in FIG. 6, although it will be appreciated that the WLAN and AP 14 are not part of the EUTRAN architecture. As is known in the art, the UE 12 may be capable of aggregating multiple carriers from a single eNB 10 or multiple eNBs 10, and may be capable, in some embodiments, of aggregating a carrier from the LTE network 2 with a carrier from the WLAN AP 14.

In order to implement some of the various embodiments described herein, a communication path is established between the WLAN AP 14 and at least one of the nodes 10 in the LTE network 2 so that a dedicated connection can be established between the nodes. This is shown in FIG. 6 as interface 16. It will be appreciated that this connection would typically be established via the broadband connection of WLAN AP 14, rather than there being a direct (e.g., air interface) signaling connection between the AP 14 and eNB 10. Similar interfaces may be established between one eNB 10 and multiple WLAN APs 14. It will also be appreciated that where the AP 14 is within the coverage area of several eNBs 10, the AP 14 may have separate interfaces 16 to each of those eNBs 10.

Inter-node interfaces 16 between pairs of nodes 10, 14 may use a peer to peer interface, i.e., an interface that connects the two nodes directly. Alternatively, inter-node interfaces could connect the two nodes while passing through other network nodes.

Figure 7:
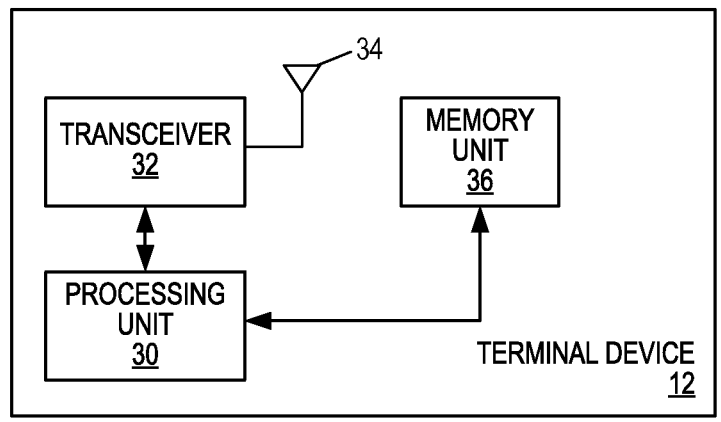
FIG. 7 is a block diagram of a terminal device according to some embodiments of the disclosed techniques.

FIG. 7 shows a terminal device 12 or user equipment (UE) that can be adapted for use in one or more of the example embodiments described herein. The terminal device 12 comprises a processing unit 30 that controls the operation of the terminal device 12. The processing unit 30 is connected to a receiver or a transceiver 32 (which comprises a receiver and a transmitter) with associated antenna(s) 34 which are used to receive signals from or both transmit signals to and receive signals from two different types of radio access network (i.e., two radio access networks that are operating according to different radio access technologies, RATs), such as RAN node 10 in the LTE network 2 and access point (AP) 14 in a WLAN. The terminal device 12 also comprises a memory unit 36 that is connected to the processing unit 30 and that stores computer program code and other information and data required for the operation of the terminal device 12. Together, the processing unit 30 and the memory unit 36 may be referred to as a processing circuit.

Figure 3:
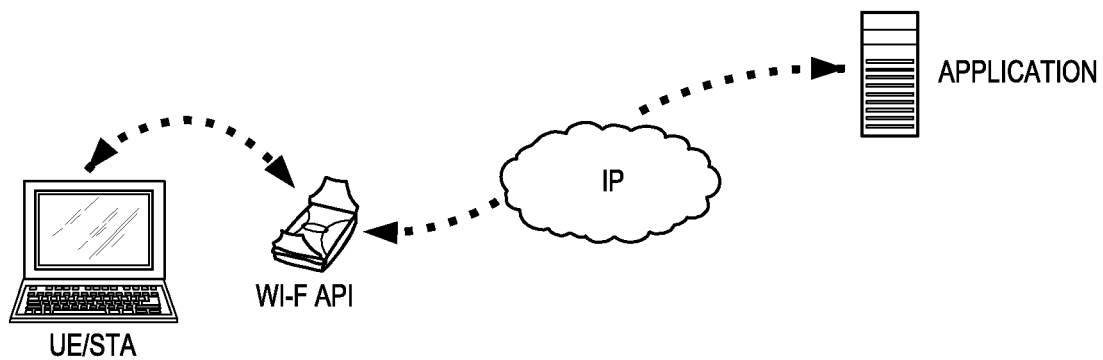
FIG. 3 illustrates a simplified Wi-Fi user plane architecture.
Figure 4:
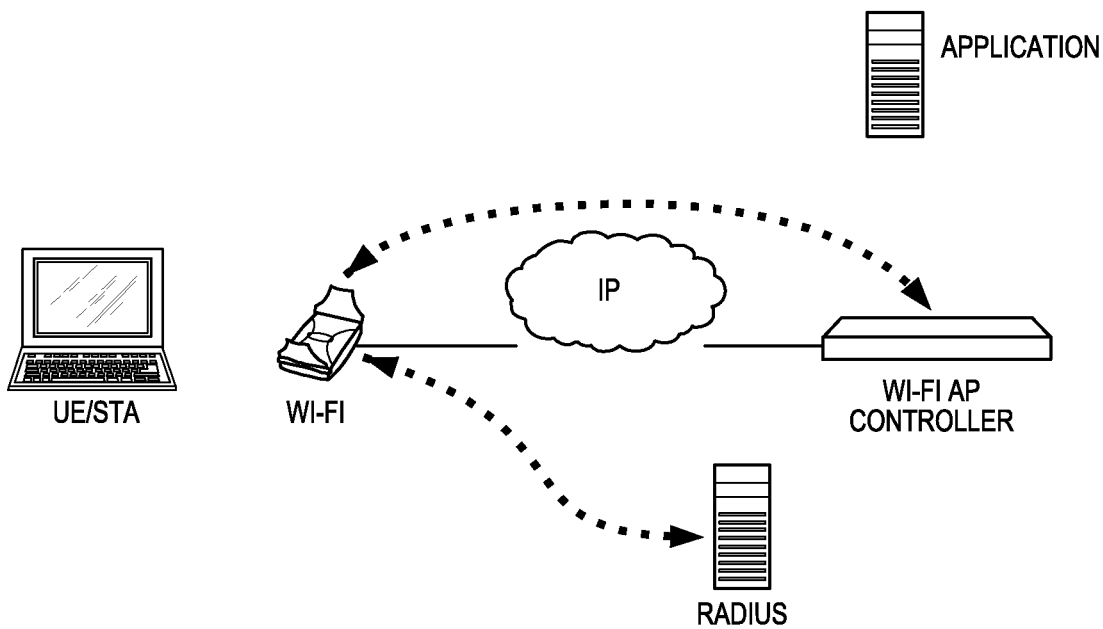
FIG. 4 illustrates a simplified Wi-Fi control plane architecture.
Figure 5:
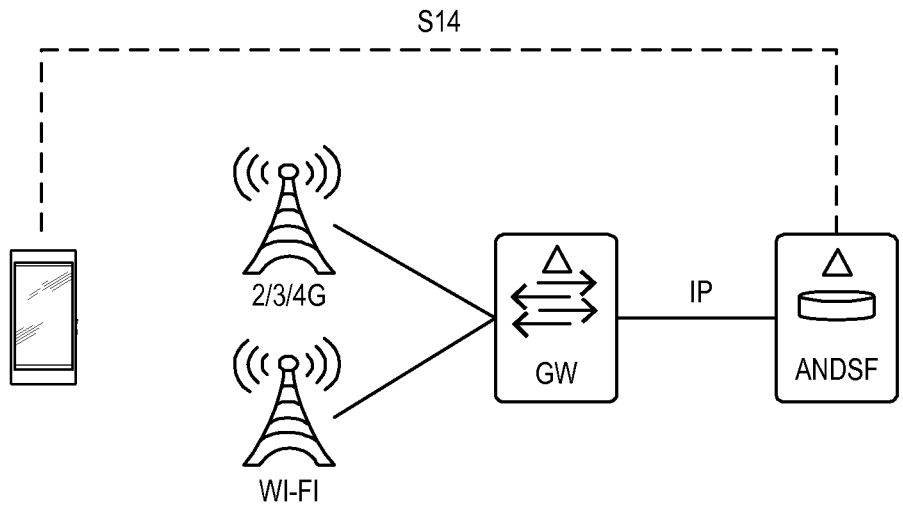
FIG. 5 illustrates the ANDSF architecture.
Figure 8:
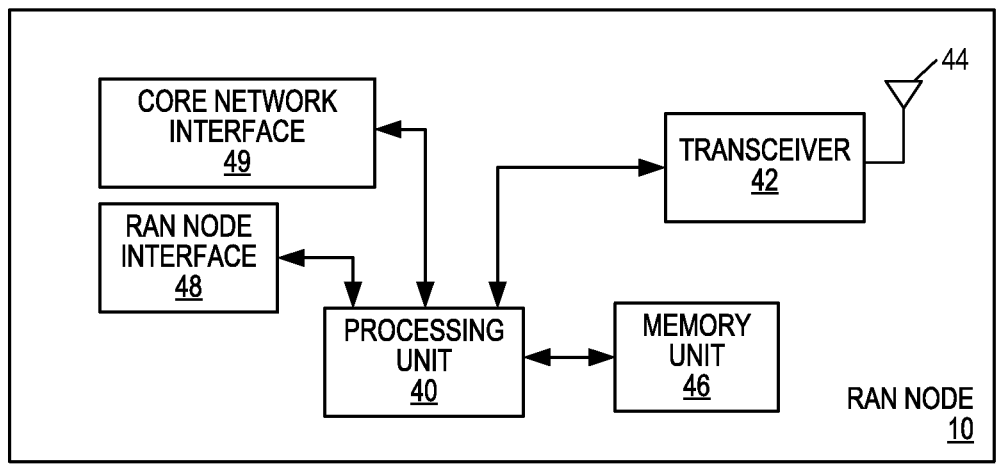
FIG. 8 is a block diagram of a radio access network node according to some embodiments of the disclosed techniques.

FIG. 8 shows a RAN node 10 (for example a base station, NodeB or an eNodeB) that can be adapted for use in several of the example embodiments described herein. The RAN node 10 comprises a processing unit 40 that controls the operation of the base station 10. The processing unit 40 is connected to a transmitter or a transceiver 42 (which comprises a receiver and a transmitter) with associated antenna (s) 44 which are used to transmit signals to, and receive signals from, terminal devices 12 in the network 2. The RAN node 10 also comprises a memory unit 46 that is connected to the processing unit 40 and that stores computer program code and other information and data required for the operation of the RAN node 10. Together, the processing unit 60 and memory unit 66 may be referred to as a processing circuit. The RAN node 10 also includes components and/or circuitry 48 for allowing the RAN node 10 to exchange information with other RAN nodes 10 (for example via an X2 interface) and components and/or circuitry 49 for allowing the RAN node 10 to exchange information with nodes in the core network 4 (for example via the S1 interface). It will be appreciated that RAN nodes for use in other types of network (e.g., a Wideband Code-Division Multiple-Access, WCDMA, RAN) will include similar components to those shown in FIG. 3 and appropriate interface circuitry 48, 49 for enabling communications with the other network nodes in those types of networks (e.g., other base stations, mobility management nodes and/or nodes in the core network).

Figure 9:
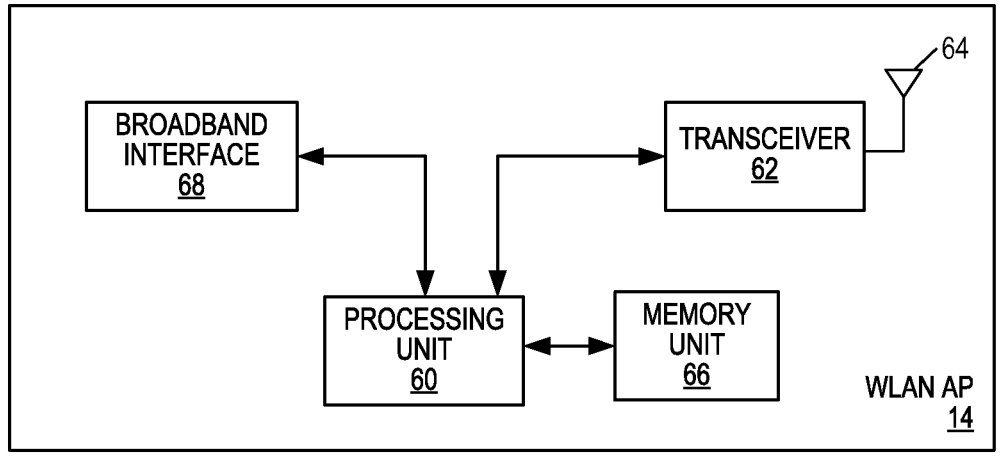
FIG. 9 is a block diagram of a WLAN access point according to some embodiments of the disclosed techniques.

FIG. 9 shows a WLAN AP 14 that can be used in the example embodiments described. The AP 14 comprises a processing unit 60 that controls the operation of the AP 14. The processing unit 60 is connected to a transmitter or a transceiver 62 (which comprises a receiver and a transmitter) with associated antenna(s) 64 which are used to transmit signals to, and receive signals from, terminal devices 12. The AP 14 also comprises a memory unit 66 that is connected to the processing unit 60 and that stores computer program code and other information and data required for the operation of the AP 14. Together, the processing unit 60 and memory unit 66 may be referred to as a processing circuit. The AP 14 also includes components and/or circuitry 68 for connecting the AP 14 to a telephone line or other broadband connection.

It will be appreciated that only the components of the terminal device 12, RAN node 10, and AP 14 required to explain the embodiments presented herein are illustrated in FIGS. 7, 8, and 9.

3GPP is currently specifying mechanisms for access selection and/or traffic steering between 3GPP networks and WLAN. These mechanisms are described in the 3GPP document 3GPP TS 36.300 v12.2.0 (June 2014), which is available at http://www.3gpp.org. More particularly, sections 23.6.1 and 23.6.2 of this 3GPP document provide a simplified description of this mechanism.

An example of a traffic steering rule is shown below:

---

If (RSRP < RSRP_threshold_low) AND (RSSI > RSSI_threshold_high) AND (WLAN_utilization < WLAN_utilization_threshold_low) then
    OFFLOAD FROM 3GPP TO WLAN
else
  If (RSRP > RSRP_threshold_high) OR (RSSI< RSSI_threshold_low) OR (WLAN_utilization > WLAN_utilization_threshold_low) then
    OFFLOAD FROM WLAN TO 3GPP

---

A more detailed description of the access network selection and traffic steering rules is provided in section 5.6 of 3GPP TS 36.304, v.12.2.0 (September 2014), also available at http://www.3gpp.org.

With the traffic steering mechanisms described in the above-mentioned 3GPP documents, the 3GPP RAN is influencing, and to some degree controlling, the terminal's access network selection and/or traffic steering decisions between 3GPP and WLAN.

One approach to traffic steering is a fully network-controlled solution. In the 3GPP context, a fully network-controlled WLAN/3GPP interworking solution follows principles similar to CONNECTED mode operations in 3GPP. An example solution (outlined in the 3GPP document 3GPP TR 37.384, v12.0.0 (December 2013), available at http://www.3gpp.org) employs three main steps, plus an acknowledgement step, for traffic steering, as illustrated in FIG. 10.

Figure 10:
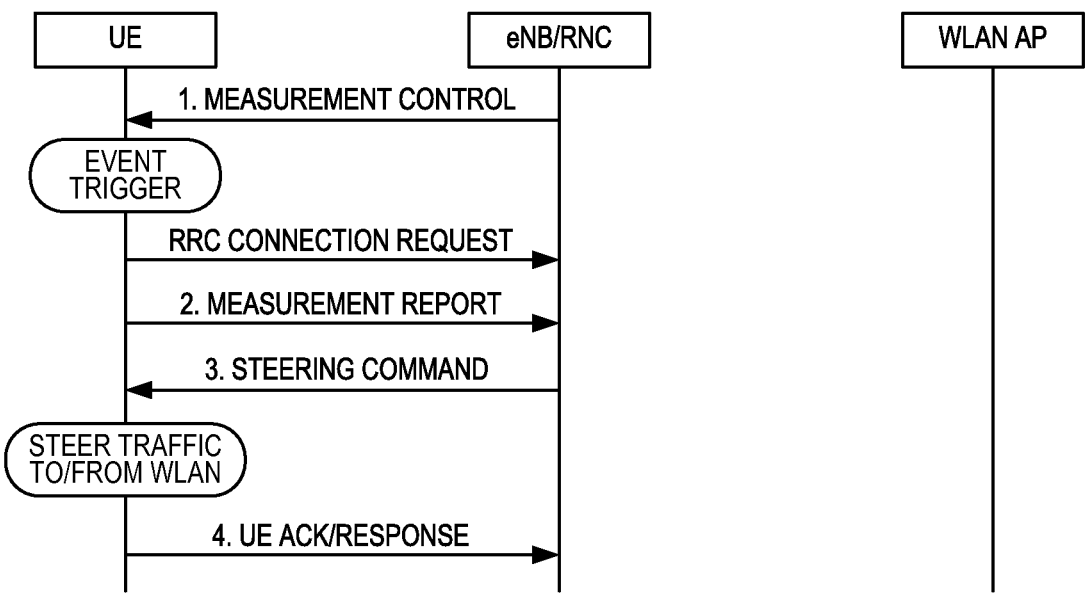
FIG. 10 is a signal flow diagram illustrating an example of fully network-controlled WLAN interworking.

The steps shown in FIG. 10 include:
1. Measurement control configuration: The RAN sends information to the UE that includes details like the target WLAN(s) to be measured (e.g., specific identities such as SSIDs/BSSIDs/HESSIDs or more general information like operating frequencies), events/thresholds for triggering measurement reports (e.g., when WLAN signal becomes better/worse than a certain threshold, WLAN signal becomes better/worse than a certain threshold and 3GPP signal becomes worse/better than another threshold, etc.).
2. Measurement reporting: When the conditions for triggering thresholds, as configured in Step 1 above, are fulfilled, the UE sends a measurement report to the 3GPP RAN.
3. Traffic steering: Based on the measurement report received in Step 2, the RAN evaluates the received measurements and other relevant information obtained in eNB/RNC and as a result of this sends a traffic steering command to the UE, which can specify the traffic to be steered. This can be an explicit indication of each bearer to be moved (i.e., by specifying DRB/RB-IDs) or more general like the QoS Class Identifier (QCI), which can apply to many bearers at once.
4. UE ACK/Response: In this step the UE indicates to the RAN whether or not the action dictated by the traffic steering command was successfully performed or not.

UEs in IDLE mode can request to setup an RRC connection for the sake of sending measurement reports when the conditions of Step 1 are satisfied. Alternatively, network-assisted approaches to traffic steering, which are equally applicable to both IDLE and CONNECTED UEs, might be employed for handling IDLE UEs while the network-controlled approach described above is used only for CONNECTED UEs.

Figure 11:
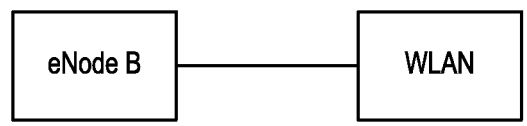
FIG. 11 illustrates an interface between eNodeB and WLAN.

A working group in 3GPP has investigated potential enhancements of RAN interfaces and procedures to support joint operation among different RATs, including WLAN. This joint operation is facilitated by the specification of an interface between the E-UTRAN and WLAN. This interface is illustrated, at a high level, in FIG. 11, below.

The working group has also discussed another use case for 3GPP WLAN interworking, to help the RAN steer UEs back to cellular for better user experience. This requires an investigation of the necessary information exchange between 3GPP and WLAN to estimate UE throughput in WLAN. Parameters that may be beneficial to exchange from WLAN to the eNB have been discussed; some of these are listed below.

BSS load: The BSS load element defined by the IEEE [in IEEE Std 802.11™-2012, IEEE Standard for Information technology-Telecommunications and information exchange between systems-Local and metropolitan area network] contains three metrics: station count, channel utilization, and the available admission control. Note that BSS, or Basic Service Set, refers to a WLAN AP and its associated STAs. The three metrics are defined as follows [in IEEE Std 802.11™-2012, IEEE Standard for Information technology-Telecommunications and information exchange between systems-Local and metropolitan area network]—

The STA Count field is interpreted as an unsigned integer that indicates the total number of STAs currently associated with this BSS.

The Channel Utilization field is defined as the percentage of time, linearly scaled with 255 representing 100%, that the AP sensed the medium was busy, as indicated by either the physical or virtual carrier sense (CS) mechanism. When more than one channel is in use for the BSS, the Channel Utilization field value is calculated only for the primary channel. The computed formula is also available in [IEEE Std 802.11™-2012, IEEE Standard for Information technology-Telecommunications and information exchange between systems-Local and metropolitan area network].

The Available Admission Capacity field is 2 octets long and contains an unsigned integer that specifies the remaining amount of medium time available via explicit admission control, in units of 32 μs/s. The field is helpful for roaming STAs to select an AP that is likely to accept future admission control requests, but it does not represent an assurance that the HC admits these requests.

WAN metrics: WAN metrics defined in [Wi-Fi Alliance® Technical Committee, Hotspot 2.0 Technical Task Group Hotspot 2.0 (Release 2) Technical Specification Version 3.11] includes the Downlink/Uplink speed and the Downlink/Uplink load, as following:

The Downlink Speed is a 4-octet positive integer whose value is an estimate of the WAN Backhaul link current downlink speed in kilobits per second. For backhaul links that do not vary in speed or those for which no accurate estimation can be made, this attribute contains the nominal speed.

The Uplink Speed is a 4-octet positive integer whose value is an estimate of the WAN Backhaul link's current uplink speed in kilobits per second. For backhaul links that do not vary in speed or those for which no accurate estimation can be made, this attribute contains the nominal speed.

The Downlink Load is a 1-octet positive integer representing the current percentage loading of the downlink WAN connection, scaled linearly with 255 representing 100%, as measured over an interval the duration of which is reported in Load Measurement Duration.

The Uplink Load is a 1-octet positive integer representing the current percentage loading of the uplink WAN connection, scaled linearly with 255 representing 100%, as measured over an interval the duration of which is reported in Load Measurement Duration. It is noted that the backhaul available downlink bandwidth can be calculated as the Downlink Speed* (1−Downlink Load/255). The backhaul available uplink bandwidth is defined similarly. The current backhaul speed/load or available bandwidth may limit the expected throughput for a new incoming UE.

UE average data rate in WLAN APs: The UE average data rate in WLAN APs may be calculated separately for the downlink and uplink. For downlink, the UE average data rate in an AP may be calculated as total data successfully sent out by the AP, divided by the number of UEs and divided by the monitoring time. The calculation of uplink average data rate is similar. In addition, this metric may be calculated for different RCPI/RSNI levels and in different ACs for QoS APs. In this case, the AP divides reported RCPI/RSNI into several levels. For STAs belonging to the same level of RCPI/RSNI, the AP calculates the average data rate separately. The RAN may compare the UE average data rate of each AP with the throughput obtained in the serving cell to determine if the AP is a candidate for offloading. This metric may be collected correlated with the RCPI/RSNI.

Figure 12:
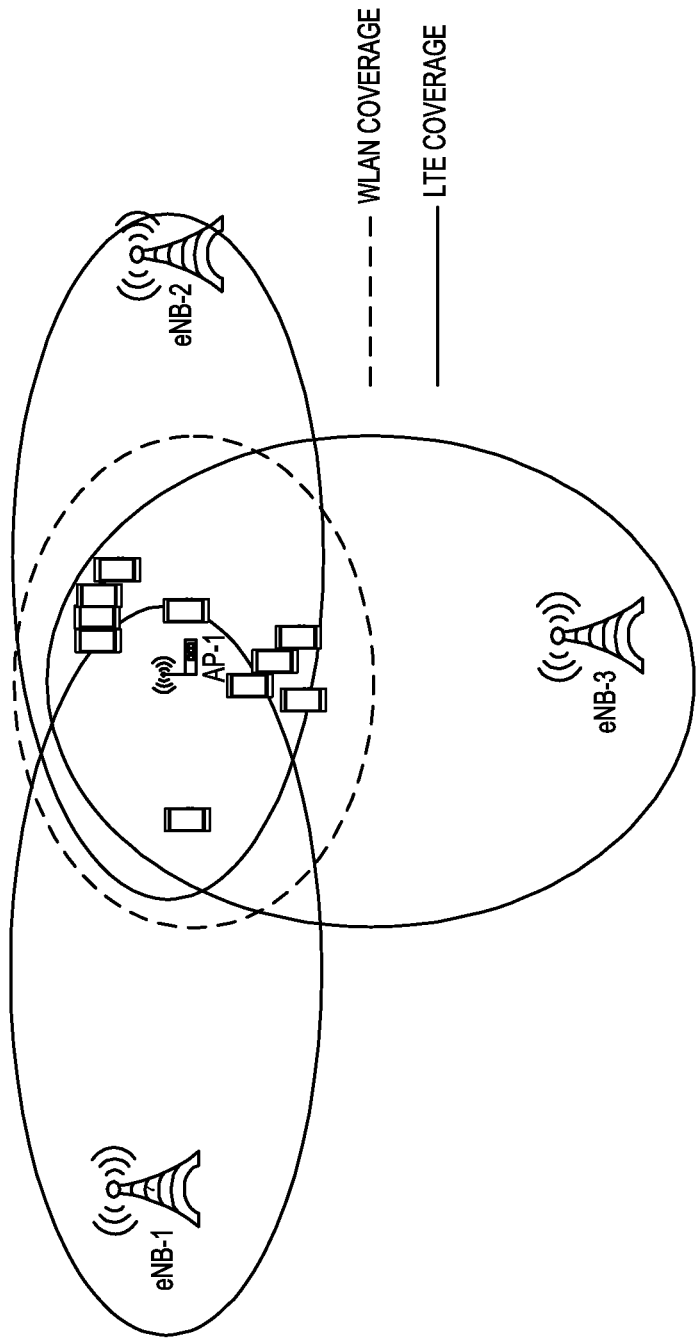
FIG. 12 illustrates an example scenario in which the coverage of a WLAN access point overlaps with the coverage of multiple E-UTRAN cells.

Some 3GPP efforts have focused on the scenario where an overloaded eNB is able to request load reports (and some other parameters for throughput estimation) from the WLAN, so that the eNB can adapt thresholds to possibly offload traffic to a given WLAN AP with overlapping coverage. A scenario that has not been addressed yet consists of the LTE load getting lower, and the LTE cell being capable again to serve the UEs that were previously steered to the WLAN. Note that this scenario creates additional challenges in non-co-located deployments, where the WLAN coverage overlaps with the coverage of multiple E-UTRAN cells, as shown in FIG. 12.

The challenges can be illustrated by the following example. At a certain time, an LTE cell gets overloaded and, based on load reports from the AP-1, adapts the steering thresholds so that UEs are offloaded to AP-1. The UE starts to steer its traffic towards WLAN and after an inactivity timer expires, the UE moves to RRC_IDLE while is associated with WLAN AP-1. Assuming the overlapping coverage scenario highlighted in FIG. 12, any of several different events can occur:

UEs may move and camp from the previously serving LTE cell to another LTE cell while they are associated to the same WLAN AP UEs previously camping on an LTE cell may move and camp to the cell at eNB-1.

UEs connected to an LTE cell and associated to WLAN may be subject to failure, move to Idle and select a new LTE cell while in RRC_IDLE.

Figure 13:
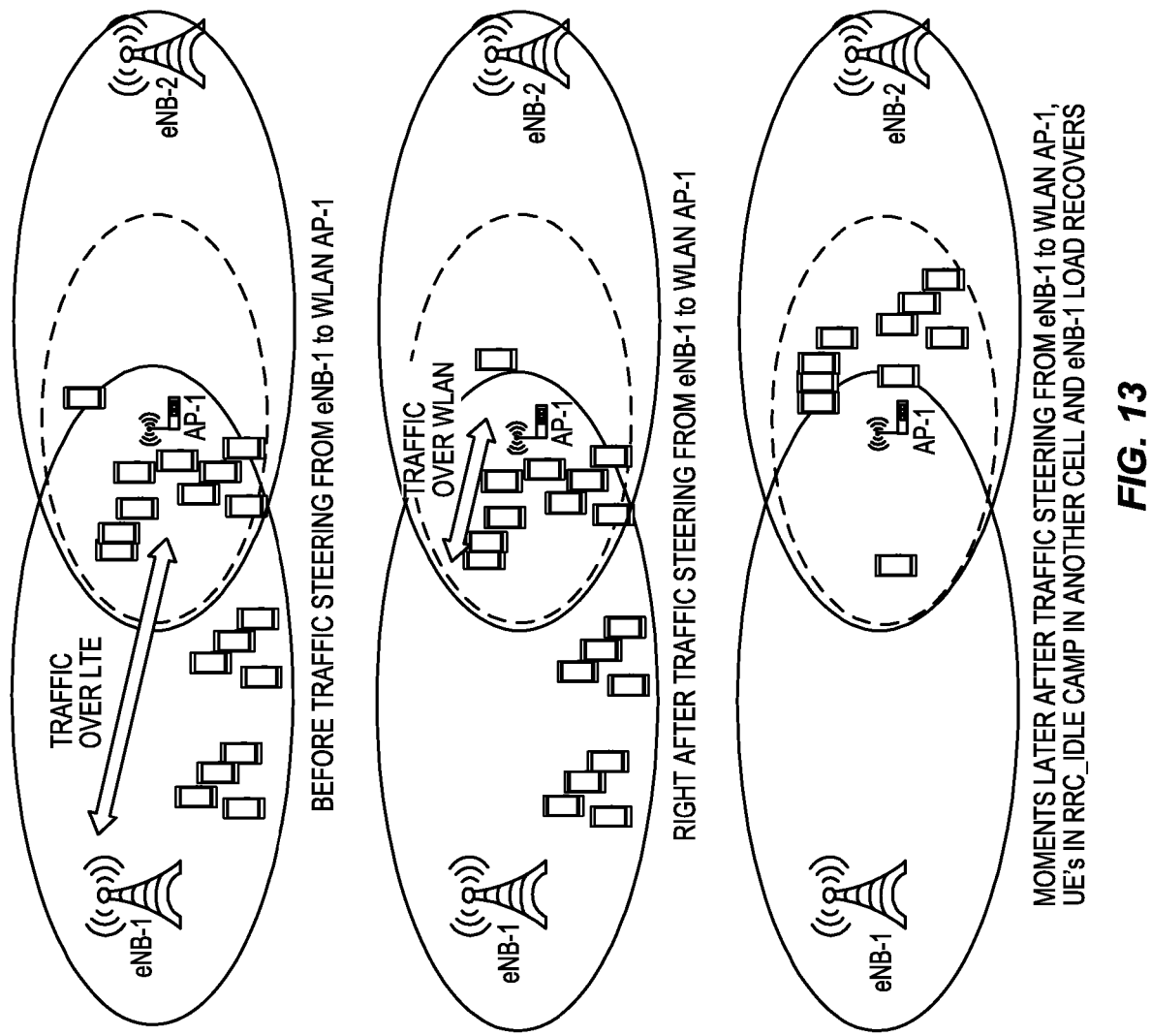
FIG. 13 illustrates an example scenario in which wireless terminals in a WLAN access point's coverage move from the coverage of one eNB to another.

If the LTE overload recovers after any of these events have occurred, the eNBs do not know how much traffic can be expected since some new UEs generating a lot of traffic may connect to the eNB cell where load reduced or UEs previously connected to the eNB's cell might have moved and could be camping in another cell. This is shown in FIG. 13.

With previously existing solutions, the eNB can request the load/capacity of APs in order to tune traffic steering thresholds to move UE's to WLAN. When this occurs, the UEs move to RRC_IDLE. When the eNB is not overloaded anymore and wants to bring UE's back, the only way to achieve is via the threshold adjusting for broadcasted threshold.

Figure 14:
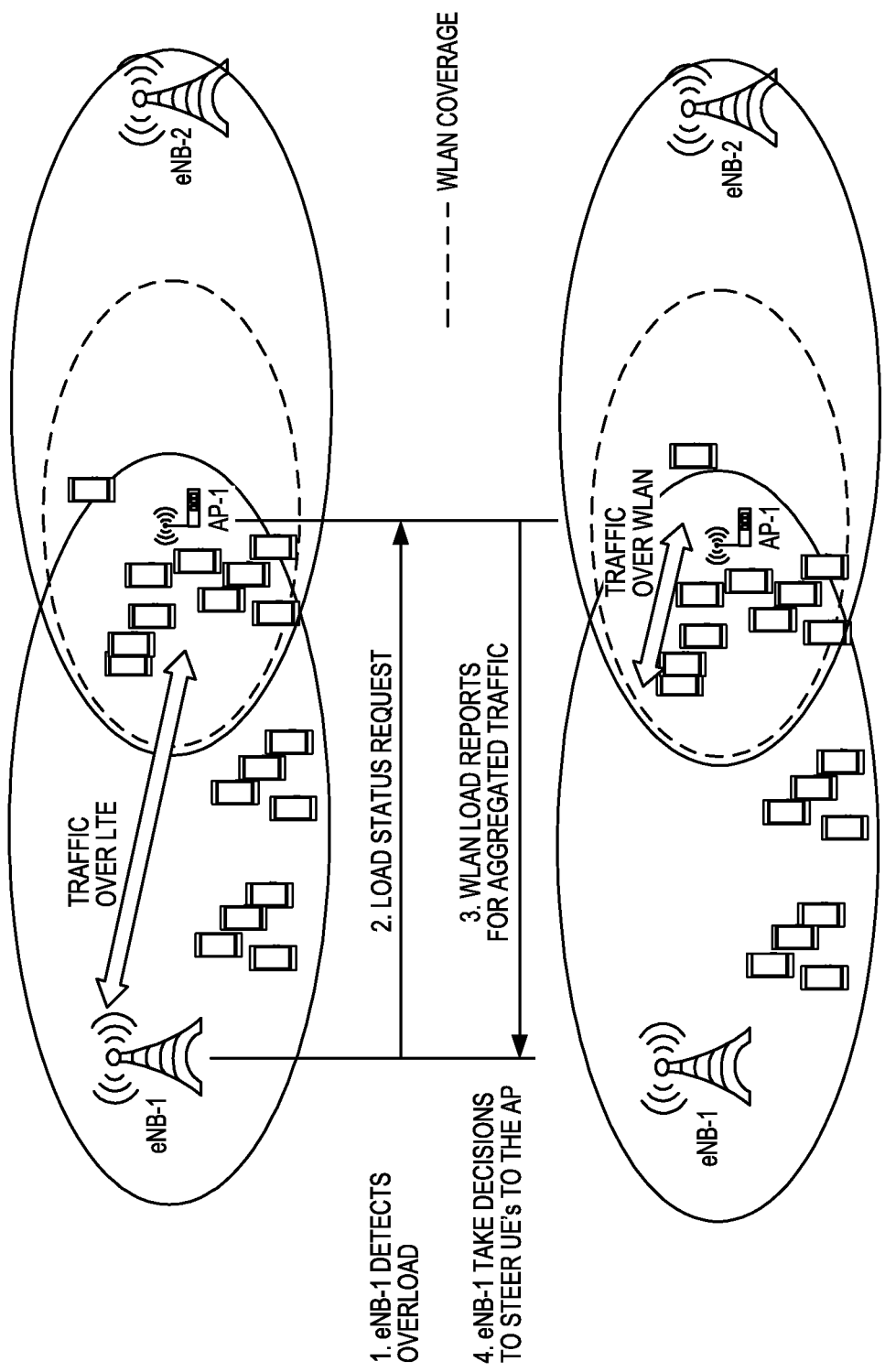
FIGS. 14 and 15 illustrate two problematic scenarios regarding the signaling of WLAN AP load to a cellular node.
Figure 15:
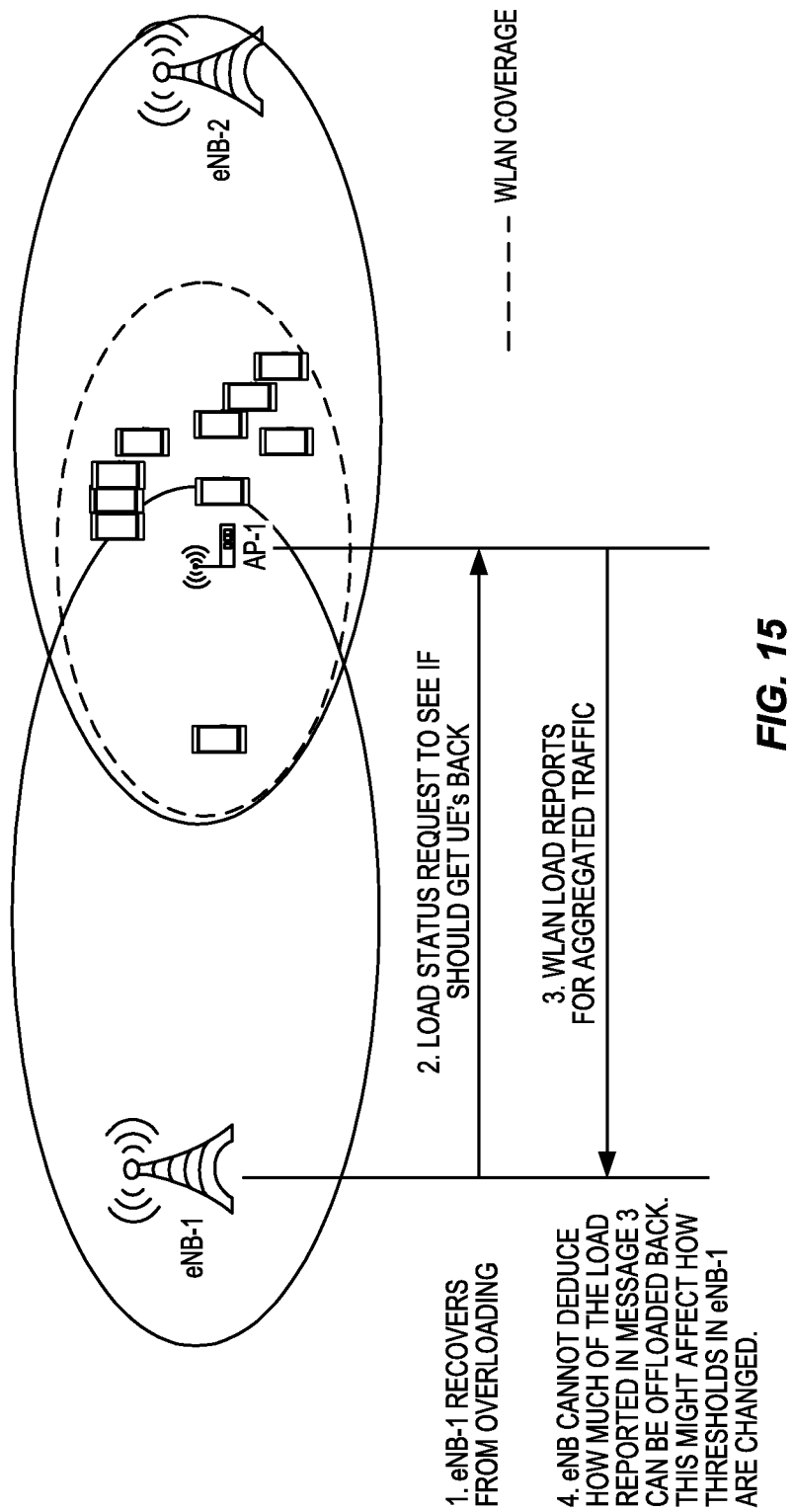

A problem with this approach is that the load reported by the AP to the eNB in previously disclosed solutions is related to all aggregated traffic. And, when the AP coverage overlaps the coverage of two LTE cells, the aggregated load information cannot allow an eNB to understand how much traffic is available for offloading back to its own cells. This may render WLAN to LTE thresholds adjustments inefficient. This is illustrated in FIGS. 14 and 15.

As an example, a situation like the following can arise. Assume that AP1 has two LTE cells hosted by two different eNBs in its coverage area. AP1 will send its load report to each eNB, i.e., eNB1 and eNB2 as per FIG. 14 and FIG. 15. Further assume that this load is equal to 90%. However, assume that out of the overall 90% load reported by AP1, only 20% is within optimal eNB1 coverage, while the rest is within optimal eNB2 coverage. Given that the eNBs do not know the percentage of the overall load in the AP that can be offloaded back to their cells, they might try to modify their thresholds for WLAN to LTE offloading in a very aggressive way, trying to capture as much traffic as possible. The latter might be inappropriate, as only part of the AP's traffic can be offloaded to a specific eNB's cell. Indeed, too aggressive thresholds may cause other UEs that should ideally be offloaded to other LTE cells to connect to the eNB's cell where thresholds were modified in an aggressive way.

Another example, where one eNB cell has two APs under its coverage, is as follows. Assume that eNB1 has two APs in its coverage area and that it receives a 50% load report from AP1 and a 90% load report from AP2. Assume also that of the UEs that are being served by AP1, five of them are camping on eNB1 and the rest are under the coverage of another eNB. On the other hand, only one of the UEs served by AP2 is camping on eNB1. When eNB1 gets these load reports from the two APs, it may react by prioritizing the offloading from AP2 instead of AP1. This may not be the ideal decision from a network optimization point of view, as only the one UE from AP2 may potentially be offloaded back to eNB1, instead of the 5 from AP1.

Embodiments of the inventive techniques described herein include a set of mechanisms between the UE, the eNB and the WLAN AP. According to some of these techniques, the WLAN APs group different UEs based on the 3GPP cell/eNBs they are associated with. This grouping information is used in communicating load information to neighboring cells/eNBs. The WLAN AP reports to the eNB an enhanced load report, with different types of load metrics per incoming UEs, e.g., the share of the capacity being consumed by UEs coming from that cell/eNB. With this enhanced information, the eNB is educated about the expected traffic from WLAN if it tries to make the UEs steer traffic back to LTE, e.g., by tuning the traffic steering thresholds.

Additionally, in some embodiments of the techniques described herein, UEs report cell change events (e.g., cell reselection in IDLE mode or handover in connected mode) to the WLAN, so that the WLAN can update the load metrics associated to the concerned cells (e.g., the source and target cells in handover.)

Cell-Specific Load Reporting

In the following descriptions, the information exchange is described between the eNB and the WLAN AP. Some information may actually be contained in the WLAN AC instead of the WLAN AC, in some embodiments, without any change in the proposed solution. Further, in the embodiments described, the example of the LTE network is used. However, the methods are valid for any other radio access technology for which similar inter-RAT mechanisms may apply.

Figure 16:
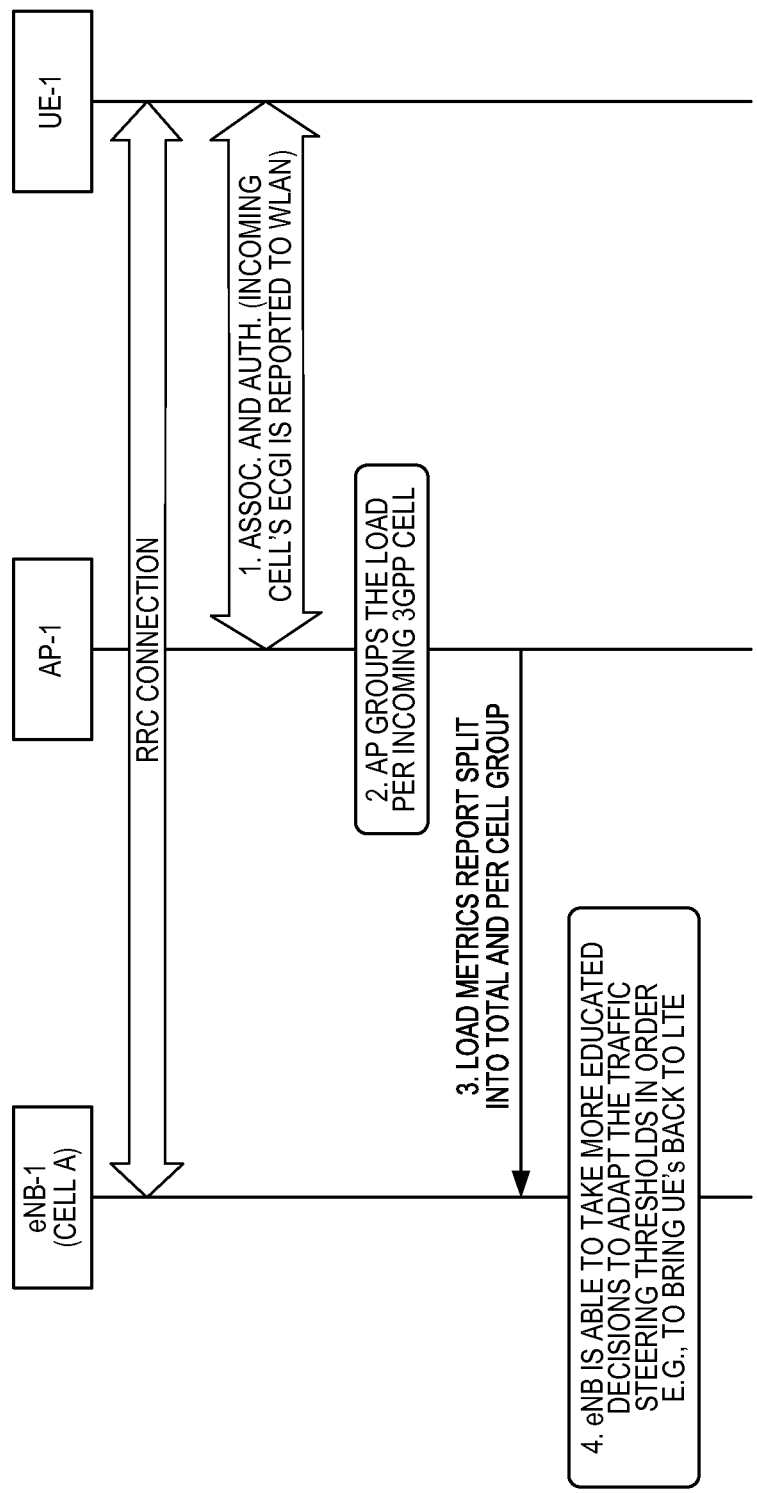
FIG. 16 is a signal flow diagram illustrating an example method for reporting WLAN access point load to a cellular node.

In a first group of embodiments according to the presently disclosed techniques, WLAN APs group different UEs based on the 3GPP cells the UEs are associated with. This information is used in communicating load information to neighboring cells, as illustrated in FIG. 16. In order to enable this grouping, UEs send an indication of the 3GPP cell ID (e.g., the ECGI) that they are associated with to the WLAN AP. "Association" here is meant to refer to the cells that the UEs are connected to if they are in connected mode and the cells that they are camping on if they are in IDLE mode.

Load reports to a neighboring eNBs then can be enhanced to consider the amount of the load contribution that is due to the UEs associated to cells belonging to that particular eNB, in addition to the aggregated information (i.e., the information relevant also to other cells). For example, the AP reports to eNB-A not only the total number of UEs connected to the AP but also the number of UEs only associated to cells belonging to the requesting eNB-A, e.g. cell-A. Based on this enhanced information, the eNB is able to take more educated traffic steering decisions since it will know the potential traffic that can be captured if traffic steering thresholds that are broadcasted are relaxed. In other words, if a WLAN AP indicates that the load generated by those UEs associated with cell-A is X, then it can be expected that steering those UEs to 3GPP will lead to the transfer of the load X from the WLAN AP towards cell-A. X may be an explicit indication of the amount of generated traffic (e.g., in bps), for example, or it may be a percentage value (e.g., 30%) of the load in the WLAN AP. If a percentage value is sent, it would be beneficial that the receiving node can, from this percentage value, be able to evaluate/estimate how much traffic this corresponds to, so that the node can know how much traffic can be expected to be steered to a particular cell. Namely, if a percentage load of traffic at the AP is signaled to indicate the traffic that could be offloaded back to a specific cell, such percentage should be associated with an indication of the overall capacity of the AP, so that it is possible to estimate how much resources such percentage traffic will occupy at the LTE cell. One way to address this issue would be to signal the overall AP cell capacity to the eNB hosting the neighboring cell.

In some embodiments, the AP may report the total load $X_{tot}$ and signal a ratio that corresponds to how much of the $X_{tot}$ is generated by UEs associated with cell A; this ratio is denoted as $X_A$ hereafter. For example, the WLAN AP reports to cell A that the total load of the WLAN AP (i.e., $X_{tot}$) is 70% and that the UEs associated with cell A are generating 50% of that 70% (i.e., $X_A$ is 50%).

The 3GPP EUTRAN Cell Global Identifier (ECGI) for a given UE, which may be used by the WLAN AP to sort the load among multiple cells in the area, may be sent to the WLAN AP during the procedure used for connecting the UE to the WLAN. "Connecting" here may include one or more of the following, for example:

- 802.11 authentication (Authentication to the WLAN AP) has been completed or is under way;
- 802.1x EAP-SIM authentication (Authentication to the AAA-servers) has been completed or is under way;
- Four way hand-shake between the terminal and the WLAN has been completed;
- An IP address has been assigned to the terminal in WLAN;
- A PDN connection has been established through the WLAN, i.e., a connection between the terminal and the PDN gateway;
- Data traffic has been started through the WLAN.

It should be noted that the present description refers to "UE" in some places—while this is a 3GPP term for a wireless terminal, this term as used herein should also be understood to correspond to wireless terminals that support the WLAN, which are commonly referred to with other terms such as STA, the term used in IEEE specifications for a terminal.

Signaling messages for reporting the resource usage from the AP to an eNB can be based on message formats provided in 3GPP TS 36.423, for example. These example messages can include fields indicating an aggregated load and a per-eNB-cell load for a WLAN AP, for example. It is possible to report the load from multiple BSSIDs (e.g., if the reporting entity is a WLAN AC).

In some embodiments, a resource usage report message as described above is sent by the AP to the eNB to report resource usage measurements. In some embodiments, an aggregate resource usage for a BSS is provided together with partial resource usage metrics indicating the usage of resources for those UEs associated (i.e. connected in active or Idle) to a specific ECGI. Note again that BSS, or Basic Service Set, refers to a WLAN AP and its associated STAs. The resource utilization metrics are all provided with respect to a BSS Capacity Class Value, i.e., to a value that represents the overall BSS capacity. In some embodiments, the BSS Capacity Class Value is specified as an integer and the scale is specified as linear. However there are several other ways to specify such values, such as in overall sustainable throughput in overall amount of time and/or frequency resources. Further, the scale of the BSS cell capacity class value need not be linear.

By means of signaling a report as described above, a receiving node is able to understand:
  i) The overall load sustained at the neighboring WLAN AP, hence allowing optimal offloading towards such AP and
  ii) The load at the neighboring AP generated by UEs that could potentially be offloaded back to the neighboring eNB, hence allowing for tuning of the WLAN to LTE thresholds in an optimal way, e.g., until all such load is shifted back to LTE.

Handling of Cell Change Events

In a second group of embodiments according to the presently disclosed techniques, UEs connected to a WLAN report 3GPP cell change events to the WLAN. This can be done via a MAC frame with a given flag, for example, so that the AP recognizes that the control message is related to a cell change, in addition to an indication of which cell the UE has changed to. Upon the reception of these indications from one or multiple UEs, the AP updates the load information, i.e., the load-per-cell, such as $X_A$ in the above example. With the enhanced reporting, the eNB is informed about the potential traffic that can potentially be transferred to it.

The 3GPP cell change events referred to above include IDLE mode cell selections and reselections; connected mode handovers; reconnections after radio link failures/detachments, and may, in general, include any event that would imply a change of cell from which the UE would consider WLAN to LTE mobility thresholds.

For example, if the WLAN AP is currently having a load of $X_{tot}$, of which the UEs associated with cell-A generate a load $X_A$ and the UEs associated with cell B generate a load $X_B$, the WLAN AP would indicate $X_A$ to cell A and $X_B$ to cell B. (If both cell A and cell B belong to the same eNB, the indications can be combined in one report, with an index specifying to which particular cell the load values refer to). If a UE U, which is generating load $X_U$, performs a cell reselection from cell A to cell B then $X_A$ would become $X_A-X_U$ and $X_B$ would become $X_B+X_U$. These updated $X_A$ and $X_B$ can then be sent to cell A and cell B respectively. This is illustrated in FIG. 17, where it is assumed that cell-A and cell-B belong to different eNBs.

Triggering Events for Load Reporting

Figure 17:
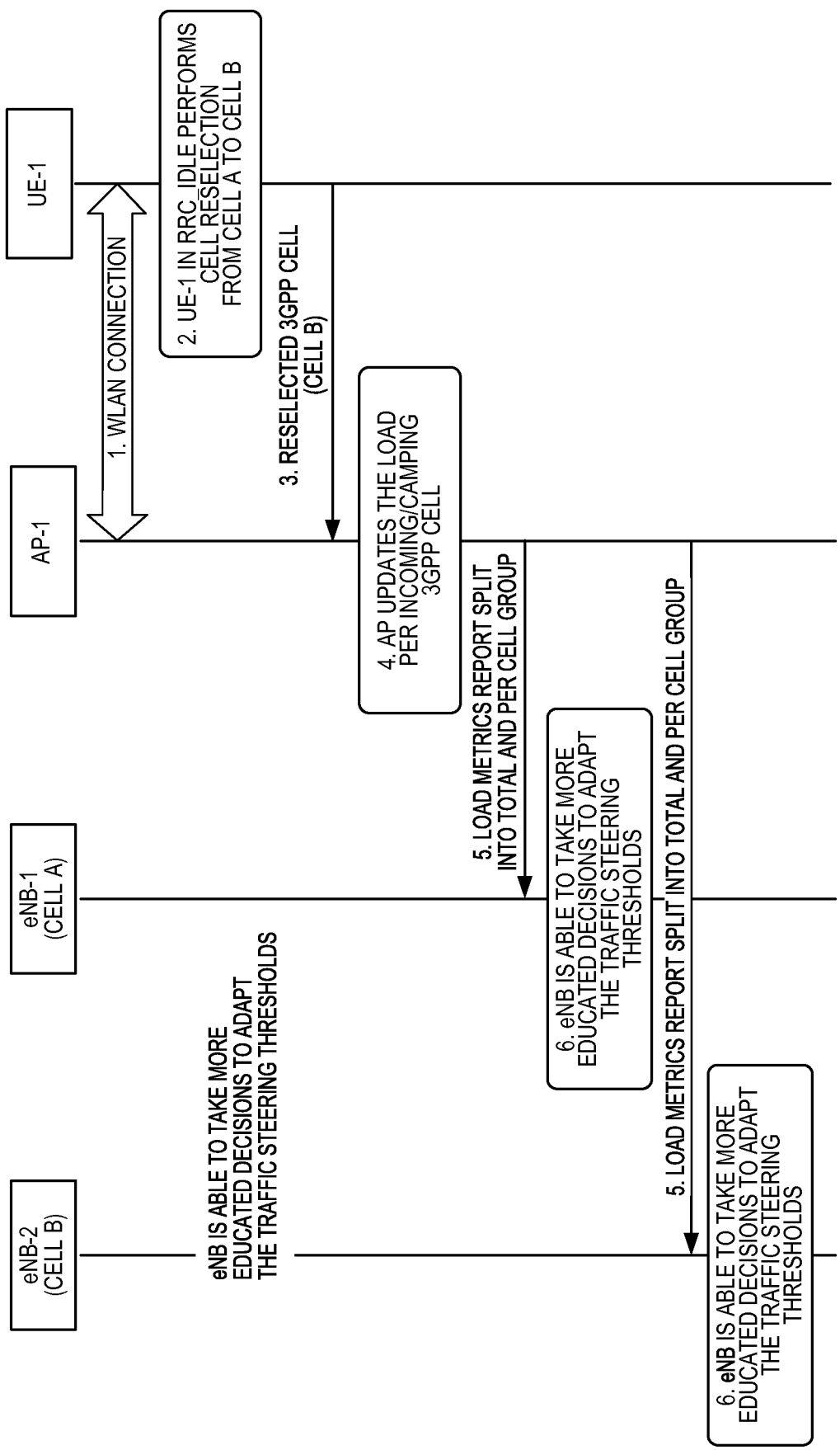
FIG. 17 is a signal flow diagram illustrating an example method for reporting cell change events to a WLAN access point.

As illustrated in FIG. 17, the change of cells of the UEs may result in the updating of the load information to be sent to the affected eNBs (i.e., the eNBs providing the cells). The reporting of this updated information (message 5 in FIG. 17) doesn't necessarily have to happen immediately after the changes have occurred (i.e., message 5 doesn't necessarily have to be sent immediately after message 4). Apart from cell changing, the traffic that the UEs are generating or consuming can change quite a lot from time to time. Thus, in order to avoid this need to report change load every time it is modified, several ways of triggering load reporting are described below:

Periodic reporting—The load reporting may be triggered periodically. The periodicity P used by the WLAN AP may be common for all cells, in some embodiments—i.e., the WLAN AP would report the load to all eNBs with a periodicity P. It would also be possible that different periodicities are used for different eNBs, e.g., the WLAN AP reports load to eNB-A with a periodicity PA and reports load to eNB-B with a periodicity PB. The periodicities PA and PB may be provided by the respective eNBs (i.e., eNB A provides PA and eNB-B provides PB), in some embodiments. One benefit of these triggers is that the 3GPP eNBs will have continuous information about the load situation in the WLAN AP.

Request from the 3GPP cell—The load reporting may be triggered upon request from the 3GPP eNBs. The 3GPP eNB may send an indication to the WLAN AP when a load report is needed by the eNB. The benefit of this trigger is that unnecessary reports can be avoided, i.e., no reports will be provided to eNB-A unless the eNB determines that it needs a report (for example, when the load in one of its cells has increased or decreased above a certain threshold level, or when previously received load information needs to be updated). However, this trigger requires additional signaling between the 3GPP eNB and the WLAN AP as load report requests need to be sent. Such a mechanism would be implemented with a "Class 1" procedure (request/response), according to the tables below.

Load change—The WLAN AP may report the load when the load is changing. For the WLAN AP to consider the load to have changed, the load may need to have changed more than a threshold since the last report. For example, the WLAN AP may report the load if the load has changed more than, e.g., 5% or 2 Mbps since the last report was sent. This trigger is beneficial as it will keep the 3GPP cell up-to-date on the load situation in the WLAN APs without unnecessary load reporting, also it does not require any load report requests from the 3GPP cells.

The load change event may be considering the total load of the WLAN AP, but it is also possible to apply this trigger to individual cells. For example, if the load information relevant to a cell A (i.e. $X_A$) changes then reporting to that cell A is triggered, while reporting to other cells can be skipped.

UE connecting/disconnecting from WLAN AP—The WLAN AP may report the load when a new UE has connected and/or disconnected to/from the WLAN AP. When a new UE connects/disconnects the load situation in the WLAN AP will likely change and hence the 3GPP cells may need to be informed.

Cell change events—As explained above, the WLAN AP may update the load information when a UE indicates to the WLAN AP that a cell change event (e.g. cell reselection and handover) has happened. The cell change events may also trigger the reporting of the load information. To reduce the amount of reports, it would be possible that reports are triggered only to eNBs which are involved in cell change events. For example, if a UE performs cell reselection from a cell A to a cell B the load may only be reported to eNB-A and eNB-B where cells A and B are respectively belonging to, but not other eNBs (e.g. eNB-C) since the load information relevant for eNB-C would not change due to a UE performing cell reselection from cell A to cell B.

It can also be envisioned to use a combination of the above triggering conditions (e.g., using periodic reporting, but only if the load is above/below a certain level as compared to the previously reported level). Which trigger is applied by the WLAN AP may be determined by the WLAN AP itself. However, in some embodiments the receiving 3GPP cell configures and/or requests the WLAN AP to apply a certain trigger (or triggers) for reporting to that cell.

Note that in some embodiments the WLAN AP may apply different triggers for reporting to different 3GPP cells. For example, the WLAN AP may apply the periodic-reporting trigger for a cell A, but apply the request-from-3GPP-cell trigger and the load-change trigger for a cell B.

All of the events described above can be supported by the signaling messages shown in the Tables appended hereto.
Reporting from 3GPP to WLAN In the above sections, the handling of the reporting of WLAN load towards the 3GPP eNB has been described. Similar mechanisms can be employed when reporting load from 3GPP eNB to WLAN, if several WLAN APs are within the coverage area of one 3GPP eNB/cell. Just as in the cases described above, the 3GPP eNB groups the UEs based on the WLAN AP that the UEs are associated with, and the load reporting towards them could then consider not only the total load under the 3GPP cell but also the actual load due to UEs associated to the particular WLAN AP that the load reporting is being sent to. In order to do so, UEs inform to the 3GPP cell that they are connected to the WLAN that they are associated with and also send an update of this info whenever they change association to another WLAN AP within the coverage of the same eNB. Similar reporting triggering events could also be employed for this case.

In some embodiments described herein, the non-limiting terms UE or wireless terminal are used. These terms should generally be understood to refer to any type of wireless device adapted to communicate with a radio network node in a cellular or mobile communication system. Examples of a UE are a target device, a device to device UE, a machine type UE or a UE capable of machine to machine communication, a personal digital assistant (PDA), an iPAD, a tablet, mobile terminals, a smart phone, a laptop embedded equipped (LEE), a laptop mounted equipment (LME), and USB dongles.

It should be noted that the examples used herein are often based on LTE, while still applicable to other RATs. For example, in UMTS there "Connected" state is divided in to several sub-states where some states are more similar to IDLE mode than to CONNECTED mode in LTE. It should then be appreciated that even though we are herein saying that a certain procedure is applied when the terminal is in a certain state, this procedure is not limited to only be applied in that state as for other RATs the existing states and how they work can differ.

Figure 18:
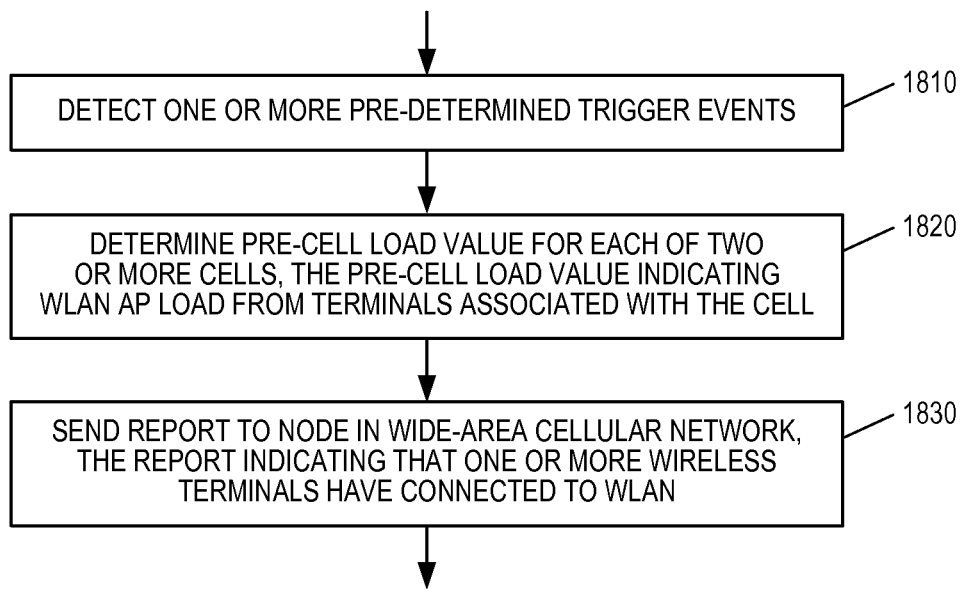
FIG. 18 is a process flow diagram illustrating an example method for reporting WLAN access point load to a cellular node.

Given the above detailed examples, it should be appreciated that these techniques may be applied more generally. For instance, FIG. 18 is a process flow diagram illustrating an example method, according to the above-described techniques, as implemented in a node of a WLAN, such as in a WLAN AP or WLAN AC.

As shown at block 1820, the method includes determining a per-cell load value for each of two or more cells in a wide-area cellular network, the per-cell load value indicating, for a first WLAN AP, a portion of the load corresponding to wireless terminals connected to the first WLAN AP and associated with the respective cell. As seen at block 1830, the method further comprises sending a report to a node in the wide-area cellular network, the report indicating the per-cell load value for at least one of the two or more cells.

In some embodiments, the report indicates, for each of the at least one of the two or more cells, the number of wireless terminals connected to the first WLAN AP and associated with the cell. The number of wireless terminals connected to the first WLAN AP and associated with the cell may be represented as a portion of a total number of wireless terminals connected to the first WLAN AP, and the total number of wireless terminals connected to the first WLAN AP may be signaled to the node in the cellular network by the node in the WLAN. In other embodiments, the number of wireless terminals connected to the first WLAN AP and associated with the cell is represented as portion of a total capacity for the first WLAN AP; the method in some cases may further comprise signaling, to the node in the wide-area cellular network, the total capacity for the first WLAN AP.

Similarly, the report in some embodiments may indicate, for each of the at least one of the two or more cells, an estimate of generated traffic corresponding to the wireless terminals connected to the first WLAN AP and associated with the cell. The estimate of generated traffic corresponding to the wireless terminals connected to the first WLAN AP and associated with the cell may be represented as portion of a total generated traffic for wireless terminals connected to the first WLAN AP in some embodiments; in some of these embodiments the method further comprises signaling, to the node in the wide-area cellular network, the total generated traffic for wireless terminals connected to the first WLAN AP. Alternatively, the estimate of generated traffic corresponding to the wireless terminals connected to the first WLAN AP and associated with the cell may be represented as portion of a total capacity for the first WLAN AP; once again, in some of these embodiments the method further includes signaling, to the node in the wide-area cellular network, the total capacity for the first WLAN AP.

As suggested above, in any of the embodiments described above, each wireless terminal may be deemed by the node of the WLAN to be "connected" to the first WLAN AP in the event that a criterion selected from the following group is satisfied: authentication to the first WLAN AP by the wireless terminal has been completed; authentication to the first WLAN AP by the wireless terminal is underway; authentication to an authentication server by the wireless terminal has been completed; authentication to an authentication server by the wireless terminal is underway; a four-way handshake between the wireless terminal and the WLAN has been completed; an Internet Protocol (IP) address in the WLAN has been assigned to the wireless terminal; a public data network (PDN) connection for the wireless terminal has been established through the WLAN; and data traffic to or from the wireless terminal and in the WLAN has begun.

In some embodiments, the node of the WLAN that sends the report is the first WLAN AP itself, whereas in other embodiments it may be another node, such as a WLAN AC, that sends the report. In some embodiments, the report specifically indicates that the per-cell load value(s) correspond(s) to the first WLAN AP, and the report further includes an additional per-cell load value for each of the two or more cells in the wide-area cellular network, the additional per-cell load value indicating a portion of the load on a second WLAN AP corresponding to wireless terminals connected to the second WLAN AP and associated with the respective cell.

In some embodiments, the method further comprises receiving, from each of a plurality of wireless terminals that are connected or that are connecting to the first WLAN AP, a cell identifier corresponding to a cell in the wide-area cellular network with which the wireless terminal is associated. In some of these and in some other embodiments, the method further comprises receiving, from each of one or more wireless terminals that are connected to the first WLAN AP, an indication of a cell change event for the wireless terminal, and updating the per-cell load values for each of the two or more cells in the wide-area cellular network, based on the received indications of cell change events.

In several embodiments, the method further comprises detecting at least one of one or more predetermined trigger events, as shown at block 1810 in FIG. 18, where the sending illustrated in block 1820 of FIG. 18 is performed in response to this detecting. The detected at least one trigger event may comprise at least one of the following, in some embodiments: completion of a connection procedure to the first WLAN AP by one or by a predetermined number of wireless terminals; disconnection from the first WLAN AP by one or by a predetermined number of wireless terminals; a request from the node in the cellular network; expiration of a periodic reporting interval; a change in load on the first WLAN AP by more than a predetermined amount; a change in per-cell load on the first WLAN AP by more than a predetermined amount; and a cell change event by one or by a predetermined number of wireless terminals.

Figure 19:
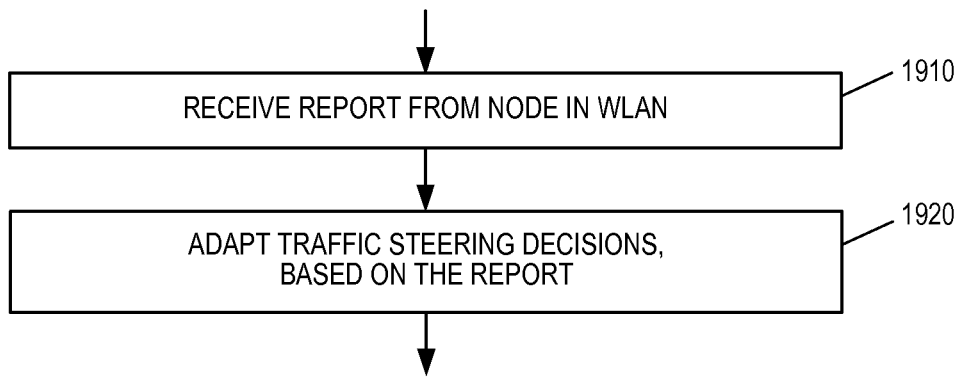
FIG. 19 is a process flow diagram illustrating an example method in a cellular network node.

FIG. 19 is a process flow diagram illustrating an example method, according to some of the above-described techniques, as implemented in a node of a cellular network, such as in an eNB of an LTE network. As shown at block 1910, the illustrated method includes receiving a report from a node in a wireless local-area network, WLAN, the report indicating a per-cell load value for at least one of two or more cells in the wide-area cellular network. The per-cell load value indicates, for a first WLAN AP, a portion of the WLAN AP's load corresponding to wireless terminals connected to the first WLAN AP and associated with the respective cell. As shown at block 1920, the method further includes adapting traffic steering decisions, based on the report. In some embodiments, for example, this adapting of traffic steering decisions comprises adjusting one or more traffic steering thresholds, based on the report.

In some embodiments, the report indicates, for each of the at least one of the two or more cells, the number of wireless terminals connected to the first WLAN AP and associated with the cell. In some of these embodiments, the number of wireless terminals connected to the first WLAN AP and associated with the cell is represented as a portion of a total number of wireless terminals connected to the first WLAN AP. In others, the number of wireless terminals connected to the first WLAN AP and associated with the cell is represented as a portion of a total capacity for the first WLAN AP.

In some embodiments, the report indicates, for each of the at least one of the two or more cells, an estimate of generated traffic corresponding to the wireless terminals connected to the first WLAN AP and associated with the cell. In some of these embodiments, the estimate of generated traffic corresponding to the wireless terminals connected to the first WLAN AP and associated with the cell is represented as a portion of a total generated traffic for wireless terminals connected to the first WLAN AP. In others, the estimate of generated traffic corresponding to the wireless terminals connected to the first WLAN AP and associated with the cell is represented as a portion of a total capacity for the first WLAN AP.

In some embodiments of the method illustrated generally in FIG. 19, the report indicates that the per-cell load value(s) correspond(s) to the first WLAN AP, and the report further includes an additional per-cell load value for each of the two or more cells in the wide-area cellular network, the additional per-cell load value indicating a portion of the load on a second WLAN access point corresponding to wireless terminals connected to the second WLAN AP and associated with the respective cell. In these embodiments, the adapting of the traffic steering decisions is based on the additional per-cell load value for each of the two or more cells in the wide-area cellular network.

Figure 20:
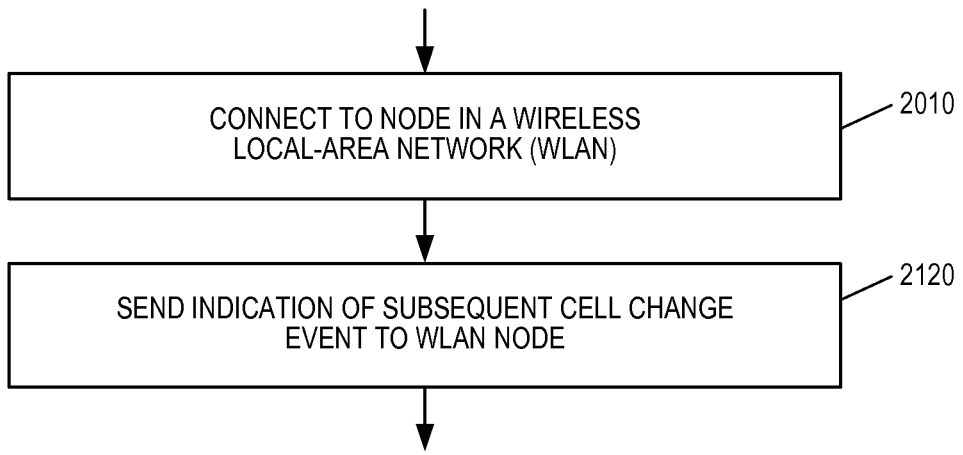
FIG. 20 is a process flow diagram illustrating an example method for reporting cell change events to a WLAN access point.

FIG. 20 is another process flow diagram, this time illustrating an example method as carried out by a wireless terminal, where the wireless terminal is adapted to operate in both a WLAN and a cellular network. As shown at block 2010, the method includes connecting to a node in a wireless local-area network (WLAN). As shown at block 2020, the method further comprises sending, to the WLAN, an indication of a subsequent cell change event for the wireless terminal in a wide-area cellular network, in response to the cell change event. The cell change event may be any one of the following, for example: an IDLE mode cell selection; an IDLE mode cell reselection; a CONNECTED mode cell handover; a reconnection after radio link failure; and a reconnection after detachment.

As noted above, embodiments of the present invention include apparatus configured to carry out one or more of the techniques described herein, including the signal flow diagrams of FIGS. 16 and 17 and the process flow diagrams of FIGS. 18-20. These apparatus include wireless terminal devices, cellular network nodes, and WLAN nodes, which in some embodiments may have configurations similar to those illustrated in FIGS. 7-9, each of which illustrates a device that includes a processing circuit comprising one or more processing elements and a memory circuit storing computer program instructions for execution by the processing circuit to carry out one or more of the methods disclosed herein.

It will be appreciated that these and similar devices may be understood as comprising one or more functional modules or units, where each functional module is configured, for example, to carry out one or more of the operations illustrated in the signal flow diagrams of FIGS. 16 and 17 and the process flow diagrams of FIGS. 18-20, or similar operations. Any one or more of these functional modules may be implemented with one or more processing circuits like those illustrated in FIGS. 7-9, for example.

Figure 21:
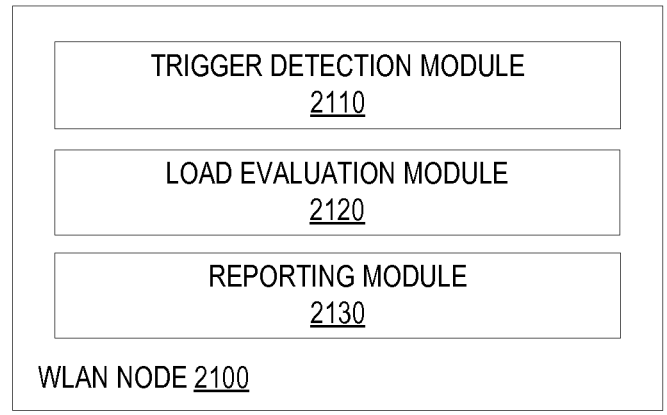
FIG. 21 is a block diagram illustrating a functional view of an example node in a WLAN.

FIG. 21 thus depicts a WLAN node 2100, including several such functional modules. More particularly, WLAN node 2100 includes a load evaluation module 2120 for determining a per-cell load value for each of two or more cells in a wide-area cellular network, the per-cell load value indicating, for a first WLAN access point, AP, a portion of the first WLAN AP's load corresponding to wireless terminals connected to the first WLAN AP and associated with the respective cell. The WLAN node 2100 further includes a reporting module 2130 for sending a report to a node in the wide-area cellular network, the report indicating the per-cell load value for at least one of the two or more cells. The illustrated WLAN 2100 still further includes a trigger detection module 2110 for detecting at least one of one or more predetermined trigger events. In some embodiments, the sending performed by reporting module 2130 is in response to this detection.

Figure 22:
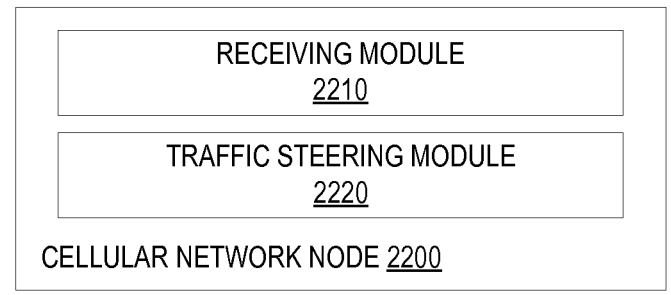
FIG. 22 is a block diagram illustrating a functional view of an example cellular network node.

Similarly, FIG. 22 depicts a cellular network node 2200, which includes a receiving module 2210 for receiving a report from a node in a WLAN, the report indicating a per-cell load value for at least one of two or more cells in the wide-area cellular network. As discussed above, the per-cell load value indicates, for a first WLAN AP, a portion of the WLAN AP's load corresponding to wireless terminals connected to the first WLAN AP and associated with the respective cell. Cellular network node 2200 further includes a traffic steering module 2220 for adapting traffic steering decisions, based on the report.

Figure 23:
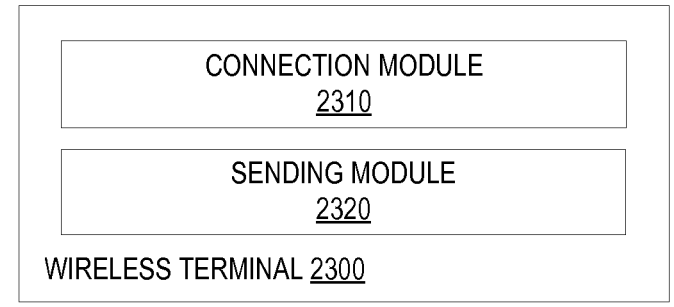
FIG. 23 is a block diagram illustrating a functional view of an example wireless terminal.

FIG. 23 is a functional representation of a wireless terminal 2300, which includes a connection module 2310 for connecting to a node in a WLAN, and a sending module 2320 for sending an indication of the cell change event to the WLAN, in response to a cell change event for the wireless terminal in a wide-area cellular network.

It will be appreciated by the person of skill in the art that various modifications may be made to the above described embodiments without departing from the scope of the present invention. For example, although embodiments of the present invention have been described with examples that reference a communication system compliant to the 3GPP-specified LTE standards, it should be noted that the solutions presented may be equally well applicable to other networks. The specific embodiments described above should therefore be considered exemplary rather than limiting the scope of the invention. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

In the present description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments have been described herein, with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) running on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure, and shall not be restricted or limited by the foregoing detailed description.

What is claimed is:

1. A method, in a node of a wireless local-area network (WLAN), the method comprising:
    determining, by a first WLAN access point (AP), a per-cell load value for each of two or more cells hosted by at least two different nodes in a wide-area cellular network that does not include the first WLAN AP, wherein:
        each per-cell load value indicates a portion of the first WLAN AP's load corresponding to wireless terminals connected to the first WLAN AP and associated with a particular cell of the two or more cells, and
        the wide-area network includes a plurality of nodes that host the two or more cells, each cell being hosted by one of the plurality of nodes; and
    sending a report to a particular node of the plurality of nodes, the report indicating the per-cell load value for each of the two or more cells that is hosted by the particular node,
    wherein the report facilitates traffic steering decisions, by the particular node, with respect to wireless terminals associated with the per-cell load values provided in the report.

2. The method of claim 1, wherein the per-cell load value for each cell indicates the number of wireless terminals connected to the first WLAN AP and associated with the cell.

3. The method of claim 2, wherein the number of wireless terminals connected to the first WLAN AP and associated with the cell is represented as a portion of a total number of wireless terminals connected to the first WLAN AP.

4. The method of claim 3, wherein the method further comprises signaling, to the node in the wide-area cellular network, the total number of wireless terminals connected to the first WLAN AP.

5. The method of claim 2, wherein the number of wireless terminals connected to the first WLAN AP and associated with the cell is represented as a portion of a total capacity for the first WLAN AP.

6. The method of claim 5, wherein the method further comprises signaling, to the particular node in the wide-area cellular network, the total capacity for the first WLAN AP.

7. The method of claim 1, wherein the per-cell load value for each cell indicates an estimate of generated traffic corresponding to the wireless terminals connected to the first WLAN AP and associated with the cell.

8. The method of claim 7, wherein the estimate of generated traffic corresponding to the wireless terminals connected to the first WLAN AP and associated with the cell is represented as a portion of a total generated traffic for wireless terminals connected to the first WLAN AP.

9. The method of claim 8, wherein the method further comprises signaling, to the particular node in the wide-area cellular network, an indication of the total generated traffic for wireless terminals connected to the first WLAN AP.

10. The method of claim 7, wherein the estimate of generated traffic corresponding to the wireless terminals connected to the first WLAN AP and associated with the cell is represented as a portion of a total capacity for the first WLAN AP.

11. The method of claim 10, wherein the method further comprises signaling, to the particular node in the wide-area cellular network, an indication of the total capacity for the first WLAN AP.

12. The method of claim 1, wherein each wireless terminal is deemed by the node of the WLAN to be connected to the first WLAN AP based on satisfying one of the following criteria:
    authentication to the first WLAN AP by the wireless terminal has been completed;
    authentication to the first WLAN AP by the wireless terminal is underway;
    authentication to an authentication server by the wireless terminal has been completed;
    authentication to an authentication server by the wireless terminal is underway;
    a four-way handshake between the wireless terminal and the WLAN has been completed;
    an Internet Protocol (IP) address in the WLAN has been assigned to the wireless terminal;
    a public data network (PDN) connection for the wireless terminal has been established through the WLAN; and
    data traffic to or from the wireless terminal and in the WLAN has begun.

13. The method of claim 1, wherein the method further comprises receiving, from each of a plurality of wireless terminals that are connected or that are connecting to the first WLAN AP, a cell identifier corresponding to a cell in the wide-area cellular network with which the wireless terminal is associated.

14. The method of claim 1, wherein the node of the WLAN that sends the report is the first WLAN AP.

15. The method of claim 1, wherein the report further includes an additional per-cell load value for each of the two or more cells that is hosted by the particular node in the wide-area cellular network, wherein each additional per-cell load value indicates a portion of the load on a second WLAN access point corresponding to wireless terminals connected to the second WLAN AP and associated with a particular cell hosted by the particular node.

16. The method of claim 1, wherein the method further comprises:
    receiving, from each of one or more wireless terminals that are connected to the first WLAN AP, an indication of a cell change event for the wireless terminal; and updating the per-cell load values for each of the two or more cells in the wide-area cellular network, based on the received indications of cell change events.

17. The method of claim 1, wherein the method further comprises detecting at least one of one or more predetermined trigger events, wherein said sending is performed in response to said detecting.

18. The method of claim 17, wherein the detected at least one trigger event comprises at least one of the following:
completion of a connection procedure to the first WLAN AP by one or by a predetermined number of wireless terminals;
disconnection from the first WLAN AP by one or by a predetermined number of wireless terminals;
a request from the node in the cellular network;
expiration of a periodic reporting interval;
a change in load on the first WLAN AP by more than a predetermined amount;
a change in a per-cell load value on the first WLAN AP by more than a predetermined amount;
a cell change event by one or by a predetermined number of wireless terminals.

19. A method, in a node of a wide-area cellular network, the method comprising:
receiving a report from a node in a wireless local-area network (WLAN), the report indicating a per-cell load value for one or more cells hosted by the node in the wide-area cellular network, wherein:
the wide-area network includes a plurality of nodes that host a plurality of cells, each cell being hosted by one of the plurality of nodes;
the wide-area cellular network does not include a first WLAN access point (AP); and
each per-cell load value indicates a portion of the first WLAN AP's load corresponding to wireless terminals connected to the first WLAN AP and associated with a cell hosted by the node in the wide-area cellular network; and
based on the report, adapting traffic steering decisions with respect to wireless terminals associated with the received per-cell load values.

20. The method of claim 19, wherein adapting traffic steering decisions comprises adjusting one or more traffic steering thresholds, based on the report.

21. The method of claim 19, wherein each per-cell load value indicates the number of wireless terminals connected to the first WLAN AP and associated with the cell.

22. The method of claim 21, wherein the number of wireless terminals connected to the first WLAN AP and associated with the cell is represented as a portion of a total number of wireless terminals connected to the first WLAN AP.

23. The method of claim 21, wherein the number of wireless terminals connected to the first WLAN AP and associated with the cell is represented as a portion of a total capacity for the first WLAN AP.

24. The method of claim 19, wherein each per-cell load value indicates an estimate of generated traffic corresponding to the wireless terminals connected to the first WLAN AP and associated with the cell.

25. The method of claim 24, wherein the estimate of generated traffic corresponding to the wireless terminals connected to the first WLAN AP and associated with the cell is represented as a portion of a total generated traffic for wireless terminals connected to the first WLAN AP.

26. The method of claim 24, wherein the estimate of generated traffic corresponding to the wireless terminals connected to the first WLAN AP and associated with the cell is represented as a portion of a total capacity for the first WLAN AP.

27. The method of claim 19, wherein the report further includes an additional per-cell load value for each of the one or more cells hosted by the node in the wide-area cellular network, wherein each additional per-cell load value indicates a portion of a second WLAN AP's load corresponding to wireless terminals connected to the second WLAN AP and associated with a cell hosted by the node in the wide-area cellular network, and wherein the method comprises adapting the traffic steering decisions based on the additional per-cell load values.

28. A method in a wireless terminal, the method comprising:
connecting to a first access point (AP) in a wireless local-area network, WLAN; and
in response to a cell change event for the wireless terminal in a wide-area cellular network, sending, to the WLAN, an indication of the cell change event, wherein:
the wide-area network includes a plurality of nodes that host a plurality of cells, each cell being hosted by one of the plurality of nodes, and
the wide-area cellular network does not include the first WLAN AP.

29. The method of claim 28, wherein the cell change event comprises one of the following:
an IDLE mode cell selection;
an IDLE mode cell reselection;
a CONNECTED mode cell handover;
a reconnection after radio link failure; and
a reconnection after detachment.

30. The method of claim 28, wherein the indication comprises an identifier of a cell in the wide-area cellular network to which the wireless terminal is associated.

31. An apparatus for use in a wireless local-area network (WLAN), the apparatus comprising processing circuitry configured to:
determine, by a first WLAN access point (AP), a per-cell load value for each of two or more cells hosted by at least two different nodes in a wide-area cellular network that does not include the first WLAN AP, wherein:
each per-cell load value indicates a portion of the first WLAN AP's load corresponding to wireless terminals connected to the first WLAN AP and associated with a particular cell of the two or more cells, and
the wide-area network includes a plurality of nodes that host the two or more cells, each cell being hosted by one of the plurality of nodes; and
send a report to a particular node of the plurality of nodes, the report indicating the per-cell load value for each of the two or more cells that is hosted by the particular node,
wherein the report facilitates traffic steering decisions, by the particular node, with respect to wireless terminals associated with the per-cell load values provided in the report.

32. The apparatus of claim 31, wherein the processing circuitry is further adapted to:
receive, from each of one or more wireless terminals that are connected to the first WLAN AP, an indication of a cell change event for the wireless terminal; and
update the per-cell load values for each of the two or more cells in the wide-area cellular network, based on the received indications of cell change events.

33. The apparatus of claim 31, wherein the processing circuit is further adapted to detect at least one of one or more predetermined trigger events and to send the report in response to said detecting.

34. The apparatus of claim 33, wherein the one or more predetermined trigger events comprise at least one of the following:
- completion of a connection procedure to the first WLAN AP by one or by a predetermined number of wireless terminals;
- disconnection from the first WLAN AP by one or by a predetermined number of wireless terminals;
- a request from the node in the cellular network;
- expiration of a periodic reporting interval;
- a change the first WLAN AP's load by more than a predetermined amount;
- a change in per-cell load value on the first WLAN AP by more than a predetermined amount;
- a cell change event by one or by a predetermined number of wireless terminals.

35. An apparatus for use in a wide-area cellular network, the apparatus comprising processing circuitry configured to:
- receive a report from a node in a wireless local-area network (WLAN), the report indicating a per-cell load value for one or more cells hosted by the apparatus in the wide-area cellular network, wherein:
  - the wide-area network includes a plurality of nodes that host a plurality of cells, each cell being hosted by one of the plurality of nodes;
  - the wide-area cellular network does not include a first WLAN access point (AP); and
  - each per-cell load value indicates a portion of the first WLAN AP's load corresponding to wireless terminals connected to the first WLAN AP and associated with a cell hosted by the apparatus in the wide-area cellular network; and
- based on the report, adapt traffic steering decisions with respect to wireless terminals associated with the received per-cell load values.

36. The apparatus of claim 35, wherein the processing circuit is adapted to adjust one or more traffic steering thresholds, based on the report.

37. The apparatus of claim 35, wherein the report further includes an additional per-cell load value for each of the one or more cells hosted by the node in the wide-area cellular network, wherein each additional per-cell load value indicates a portion of a second WLAN AP's load corresponding to wireless terminals connected to the second WLAN AP and associated with a cell hosted by the node in the wide-area cellular network, and wherein the processing circuit is further adapted to adapt the traffic steering decisions based on the additional per-cell load values.

38. A wireless terminal adapted for operation in a wireless local-area network (WLAN) and in a cellular network, the wireless terminal apparatus comprising processing circuitry configured to:
- connect to a first access point (AP) in the WLAN; and,
- in response to a cell change event for the wireless terminal in a wide-area cellular network, send, to the WLAN, an indication of the cell change event, wherein:
  - the wide-area network includes a plurality of nodes that host a plurality of cells, each cell being hosted by one of the plurality of nodes, and
  - the wide-area cellular network does not include the first WLAN AP.

* * * * *